(12) United States Patent
Subbarayan et al.

(10) Patent No.: US 10,579,999 B2
(45) Date of Patent: Mar. 3, 2020

(54) NETWORK PAYMENT TOKENIZATION FOR PROCESSING PAYMENT TRANSACTIONS

(71) Applicant: Facebook, Inc., Menlo Park, CA (US)

(72) Inventors: Anand Subbarayan, Fremont, CA (US); Namrata H. Ganatra, Menlo Park, CA (US); Vipan Reddy Raja Nalla, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 650 days.

(21) Appl. No.: 15/069,572

(22) Filed: Mar. 14, 2016

(65) Prior Publication Data

US 2017/0262842 A1    Sep. 14, 2017

(51) Int. Cl.
*G06Q 20/38*    (2012.01)
*G06Q 20/40*    (2012.01)

(52) U.S. Cl.
CPC ..... *G06Q 20/385* (2013.01); *G06Q 20/38215* (2013.01); *G06Q 20/401* (2013.01)

(58) Field of Classification Search
CPC .. G06Q 20/405; G06Q 20/40; G06Q 20/4016; G06Q 20/20; G06Q 20/3674; G06Q 20/102; G06Q 20/12; G06Q 20/322; G06Q 20/40145; G06Q 20/02; G06Q 20/10; G06Q 20/3276; G06Q 20/4012; G06Q 20/206; G06Q 20/382; G06Q 20/3829; G06Q 20/385; G06Q 20/38215; G06Q 20/401; G06Q 20/4014; G06Q 20/409; G06Q 20/425; G07F 7/1008; G07F 7/1025; G07F 13/025; G07F 19/202; G07F 19/203; G07F 7/0866; G07F 7/10; G07F 7/1016; G07F 7/1075; G07F 9/023; G07F 17/30864; G07F 1/163; G07F 21/32; G07F 3/00
USPC ............................................... 705/75
See application file for complete search history.

(56) References Cited

U.S. PATENT DOCUMENTS

| | | | |
|---|---|---|---|
| 6,327,578 B1 * | 12/2001 | Linehan | G06Q 20/02 705/65 |
| 7,210,620 B2 * | 5/2007 | Jones | G06Q 20/26 |
| 8,651,374 B2 * | 2/2014 | Brabson | G06Q 20/385 235/379 |

(Continued)

FOREIGN PATENT DOCUMENTS

WO    WO-2016164778 A1 *    10/2016    ......... H04L 63/0807

*Primary Examiner* — Jacob C. Coppola
(74) *Attorney, Agent, or Firm* — Keller Jolley Preece

(57) ABSTRACT

The present disclosure relates to systems, methods, and devices for network payment tokenization for processing payment transactions. In particular, the message system allows a consumer to initiate a payment transaction with a merchant. For example, one or more implementations involve identifying a payment authorization number associated with a user account and sending a request for a payment token to a card network system associated with the payment authorization number. One or more embodiments receive a network payment token representing the payment authorization number and a single-use cryptogram corresponding to the payment transaction. Additionally, one or more embodiments generate and send a payment transaction initiation message including the network payment token and single-use cryptogram to the merchant for processing the payment transaction.

20 Claims, 12 Drawing Sheets

(56) References Cited

U.S. PATENT DOCUMENTS

| | | | |
|---|---|---|---|
| 9,043,609 B2* | 5/2015 | Calman | G06Q 20/3224 |
| | | | 713/189 |
| 9,846,878 B2* | 12/2017 | Kumnick | G06Q 20/3674 |
| 9,848,052 B2* | 12/2017 | Kumnick | G06Q 20/385 |
| 9,942,043 B2* | 4/2018 | Palanisamy | G06Q 20/385 |
| 9,996,835 B2* | 6/2018 | Dill | G06Q 20/385 |
| 10,192,216 B2* | 1/2019 | Hammad | G06Q 20/36 |
| 2006/0235796 A1* | 10/2006 | Johnson | G06Q 20/02 |
| | | | 705/44 |
| 2008/0162295 A1* | 7/2008 | Bedier | G06Q 20/04 |
| | | | 705/26.1 |
| 2012/0158589 A1* | 6/2012 | Katzin | G06Q 20/12 |
| | | | 705/44 |
| 2013/0031006 A1* | 1/2013 | McCullagh | G06Q 20/363 |
| | | | 705/66 |
| 2013/0132283 A1* | 5/2013 | Hayhow | G06Q 20/1085 |
| | | | 705/67 |
| 2013/0311380 A1* | 11/2013 | Vines | G06Q 20/36 |
| | | | 705/66 |
| 2014/0372308 A1* | 12/2014 | Sheets | G06Q 20/40 |
| | | | 705/44 |
| 2015/0052064 A1* | 2/2015 | Karpenko | G06Q 20/3829 |
| | | | 705/71 |
| 2015/0199679 A1* | 7/2015 | Palanisamy | G06Q 20/34 |
| | | | 705/67 |
| 2015/0262166 A1* | 9/2015 | Singh | G06Q 20/341 |
| | | | 705/44 |
| 2016/0180325 A1* | 6/2016 | Davis | G06Q 20/085 |
| | | | 705/44 |
| 2016/0232527 A1* | 8/2016 | Patterson | G06Q 20/405 |
| 2016/0301683 A1* | 10/2016 | Laxminarayanan | |
| | | | H04L 63/0807 |
| 2017/0163629 A1* | 6/2017 | Law | H04L 9/3247 |
| 2017/0178124 A1* | 6/2017 | Havilio | G06Q 20/382 |

* cited by examiner

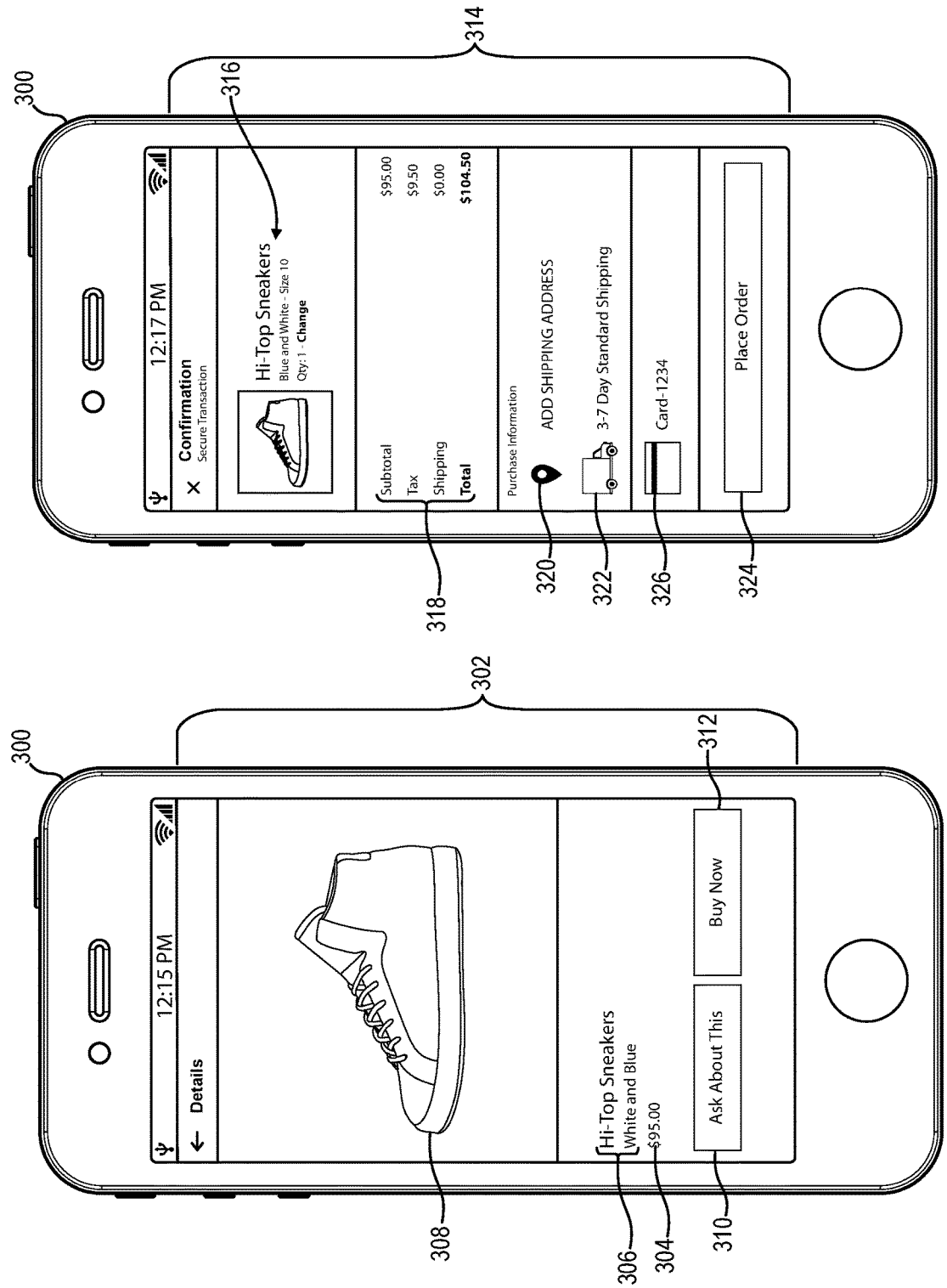

NETWORK PAYMENT TOKENIZATION FOR PROCESSING PAYMENT TRANSACTIONS

BACKGROUND

1. Technical Field

One or more embodiments described herein relate generally to systems and methods for tokenizing payment credentials. More specifically, one or more embodiments relate to systems and methods of enabling network tokenization of payment authorization numbers for processing payment transactions.

2. Background and Relevant Art

Electronic payment systems allow users to perform payment transactions with others via software applications on one or more types of devices (e.g., desktop devices and mobile devices). Some electronic payment systems allow users to perform payment transactions with financial institutions or merchants (i.e., peer-to-business payment transactions). For example, some electronic payment systems allow users to enter into payment transactions for goods or services with a merchant by way of an electronic payment application on a computing device.

Some conventional electronic payment systems improve security of electronic payment transactions by implementing tokenization at a gateway system in a payment network. Specifically, such conventional electronic payment systems integrate with a gateway system to obtain gateway payment tokens for processing payment transactions via the specific gateway system. For example, the gateway payment tokens allow users to initiate payment transactions with merchants without the merchants receiving payment credentials associated with the users or the users' devices.

Although the gateway payment tokens provide a layer of security between the users and the merchants, users are still required to provide payment credentials to the gateway system. In particular, traditional electronic payment systems that use gateway tokenization store payment credentials at the payment gateways in association with users' payment credentials. By storing payment credentials of users at gateway systems, conventional electronic payment systems introduce security risks by increasing the number of locations and entities that have the payment credentials.

Additionally, conventional electronic payment systems that use gateway tokenization for processing electronic payment transactions often require that a user provide payment credentials to multiple gateway systems. In particular, merchants choose a payment gateway system and purchasers are typically forced to use the merchant's chosen payment gateway if they want to make an electronic purchase from the merchant. Because the gateway payment token is limited to a specific gateway system, the tokens are not valid for use with other payment gateways. Thus, purchasers that shop at multiple different merchants may end up having their payment credentials stored by multiple different merchants.

Accordingly, there are a number of disadvantages with conventional electronic payment systems and methods.

SUMMARY

One or more embodiments described herein provide benefits and/or solve one or more of the foregoing or other problems in the art with systems and methods to enable network payment tokenization. In particular, the systems and methods allow users to engage in electronic payment transactions with merchants. One or more embodiments receive a request to initiate a payment transaction from a client device associated with a user account. The systems and methods identify a payment authorization number associated with the user account and request a network payment token from the card network system associated with the payment authorization number. One or more embodiments receive the network payment token and a single-use cryptogram associated with the payment transaction and send the network payment token and cryptogram to the merchant for processing the payment transaction. Thus, the systems and methods allow a user to enter into a payment transaction with a merchant without the merchants or gateway systems receiving the payment authorization number of the user.

Additionally, the systems and methods allow users to use the network payment token for entering into future payment transactions with merchants. Specifically, one or more embodiments receive a request to initiate a supplemental payment transaction with a merchant. One or more embodiments determine that the network payment token associated with the user account is stored and send a request to the card network system associated with the payment authorization number for a supplemental cryptogram. The systems and methods receive the supplemental cryptogram and send the network payment token with the supplemental cryptogram to the merchant to process the supplemental payment transaction. By storing the network payment token, one or more embodiments enable secure processing of payment transactions by reducing the number of entities that receive and store users' payment authorization numbers.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which:

FIGS. 3A-3F illustrate user interfaces for initiating a payment transaction as described in reference to FIGS. 2A-2C in accordance with one or more embodiments;

DETAILED DESCRIPTION

Figure 1:
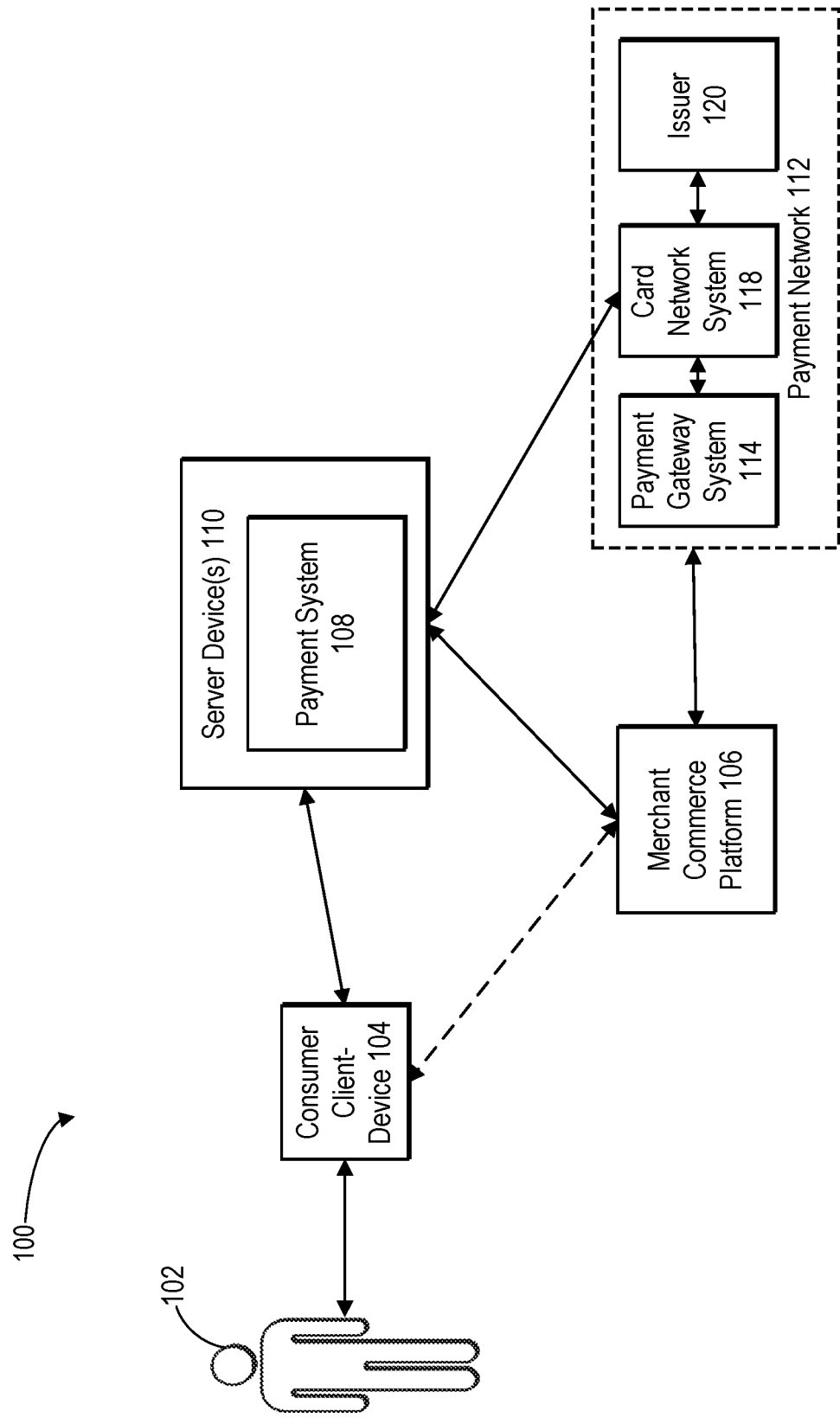
FIG. 1 illustrates a schematic diagram of an example system that facilitates the sending of messages and payments in accordance with one or more embodiments.

Embodiments of the present disclosure provide a payment system that provides users with the ability to engage in payment transactions. In particular, one or more embodiments provide a payment system that allows users to purchase goods or services using electronic payments. The payment system can allow users to initiate payment transactions with merchants that have registered with the payment system without requiring users to provide payment credentials to merchants or gateway systems. For example, the payment system initiates payment transactions using network payment tokens obtained from card network systems associated with the users' payment credentials. By using the network payment tokens to send to merchants and gateway systems, rather than payment credentials, the payment system can allow users to engage in secure payment transactions with merchants.

As mentioned, the payment system allows users to initiate electronic payment transactions with merchants. Specifically, the payment system receives a request to initiate a payment transaction with a merchant from a client device associated with a user account. For example, the payment system can allow users to send messages to and make purchases from merchant(s) via a networking system (e.g., a social networking system) with which the users are registered. The networking system can provide merchant pages and/or interfaces that allow users to view products and services that the merchant(s) provide.

After a user requests to initiate a payment transaction with a merchant, the payment system uses a payment credential such as a payment authorization number (e.g., a credit/debit card number) associated with a user account of the user to obtain a network payment token. In particular, the payment system identifies the payment authorization number associated with the user account and requests a network payment token from the card network system associated with the payment authorization number. The card network system associated with the payment authorization number returns a network payment token that represents the payment authorization number associated with the user account. The payment system uses the network payment token to initiate payment transactions for the user account instead of using the corresponding payment authorization number. By using the network payment token to initiate and process payment transactions, the payment system provides a secure electronic payment process that reduces the number of entities and/or communications that include the payment authorization number.

In addition to returning the network payment token to the payment system, the card network system associated with the payment authorization number returns a single-use cryptogram. The payment system sends the cryptogram with the network payment token to the merchant for processing the current payment transaction via a payment network. Specifically, the payment system provides the network payment token and the single-use cryptogram to the merchant. The merchant can then initiate the payment transaction by sending the network payment token and the single-use cryptogram to a gateway system or other entity in a payment network for processing the payment transaction. For example, the payment network can determine the payment authorization for charging a payment account of the user based on the network payment token and single-use cryptogram.

In one or more embodiments, the payment system stores the network payment token for use with future payment transactions. In particular, the payment system stores the network payment token on one or more servers in association with the user account. For example, the payment system can store the network payment token at the one or more servers instead of storing the corresponding payment authorization number. Storing the network payment token for use with payment transactions rather than storing and using the payment authorization number reduces the risk of exposing user's payment information at the payment system or during payment transactions.

Furthermore, because the cryptogram is single-use, the payment system does not store the cryptogram for use with future payment transactions. Rather, the payment system requests a new single-use cryptogram for each additional payment transaction associated with the user account. The card network system associated with the payment authorization number returns a new single-use cryptogram for a particular payment transaction to the payment system. Thus, for a particular payment transaction, the payment system uses the stored network payment token with corresponding single-use cryptogram when initiating the particular payment transaction with a merchant.

FIG. 1 is a schematic diagram illustrating an environment 100 that includes a payment system 100 in accordance with one or more embodiments. An overview of the environment is described in relation to FIG. 1. Thereafter, a more detailed description of the components and processes of the payment system and other components within the environment are provided in relation to the remaining figures.

As illustrated by FIG. 1, the system 100 can include a user/consumer 102, a consumer client-device 104, a merchant commerce platform 106, a payment system 108 hosted by one or more servers 110, and a payment network 112. As illustrated by FIG. 1, the payment system can allow a user ("consumer") 102 to interact with a merchant commerce platform 106 to make a purchase. Specifically, the consumer 102 uses a consumer client-device 104 to communicate with a merchant commerce platform 106. As further illustrated in FIG. 1, the consumer client-device 104 and the merchant commerce platform 106 can communicate with a payment system 108 hosted by server device(s) 110.

The payment system 108 can interact with a payment network 112 and the merchant commerce platform 106 to provide increased security for the user's purchase from the merchant commerce platform 106. To complete a financial transaction, the merchant commerce platform 106 can interact with a payment gateway system 114 for the purpose of processing a payment using the payment network 112. The payment network 112 can include a payment gateway system 114, a card network system 118, and a card issuer 120. In other embodiments, however, the payment network 112 includes more or fewer actors. Although FIG. 1 illustrates a particular arrangement of the user/consumer 102, the consumer client-device 104, the merchant commerce platform 106, the payment system 108, and the payment network 112, various additional arrangements are possible.

As briefly mentioned above, FIG. 1 shows that the user 102 can use the consumer client-device 104 to interface with a merchant commerce platform 106.

In one or more embodiments, the user 102 can access a commerce application of the merchant. The commerce application can comprise a network application, such as a web application or a native application that interfaces with the merchant commerce platform 106. The commerce application can offer the sale of goods and/or services to the user 102. The user 102 may begin an order by selecting one or more items or services offered through the commerce application. To complete the order, the user 102 traditionally would be required to enter up to 20 different payment fields, such as a first name, middle name, last name of the user, a payment card (credit card, debit card, etc.) number, an expiration date (year and/or month) of the payment card, a billing address (including street name, house number, city, state or province, zip code, country, etc.) associated with the payment card, a phone number associated with the payment card, and one or more shipping addresses (including fields similar to the billing address).

The payment system 108 can store payment information for the user 102, and can provide at least a portion of the information to the merchant commerce platform 106 to simplify the checkout experience of the user 102 and increase security. More specifically, commerce application can display or otherwise provide a selectable option to use payment information maintained by the payment system 108. If the user 102 selects the selectable option, the payment system 108 can act an an intermediary between the merchant commerce platform 106 and the user 102 to facilitate the payment transaction.

In one or more embodiments, the payment system 108 coordinates a payment transaction between one or more accounts of the user 102 and one or more accounts of the merchant via the payment network 112. For example, in response to receiving a payment message from the user 102, the payment system 108 can communicate with the payment network 112 to obtain and provide payment transaction information to process a payment using one or more components within the payment network 112, as described in more detail below. Alternatively, or additionally, the payment system 108 can maintain one or more user accounts directly, and therefore, the payment system 108 can coordinate a transaction, or a portion of a transaction.

In one or more embodiments, the payment system 108 communicates with the payment network 112 to begin the payment transaction process. As illustrated in FIG. 1, the payment network 112 includes a payment gateway system 114, a card network system 118 associated with the payment authorization number, and an issuer 120.

As used herein, the term "payment gateway system" refers to software and servers that transmit transaction information to acquiring banks and responses from issuing banks (such as whether a transaction is approved or declined). Thus, a payment gateway system facilitates communication between banks. Furthermore, payment gateway implement Payment card Industry Data Security Standard (PCI-DSS or PCI). Payment gateway systems help bridge communication protocols and provide security on behalf of a merchant. Payment gateway systems usually charge a per transaction fee. Some example of payment gateway systems include Braintree, Dwolla, Paypal, Authorize.net.

As used herein, the term "card network system" refers to an entity facilitates the payment process between credit card users, merchants, and issuers. card network systems can also dictate where credit cards can be used, authorize credit card transactions, process transactions, and set terms of transactions. Some example of card network systems include VISA, MASTERCARD, AMERICAN EXPRESS, and DISCOVER.

As used herein, the term "issuer" refers to a financial institution (e.g., a bank) that issues credit cards to consumers and services their accounts. Issuers can also be a card network system or a payment gateway system. Some example of card network systems include CHASE, BANK OF AMERICA, WELLS FARGO, U.S. BANK, and CITIBANK.

As used herein, the term "payment authorization number" refers to a number that authorizes access to the corresponding payment account. For example, a payment authorization number can be a credit card number or debit card number.

For example, the payment system 108 communicates with the card network system 118 associated with a payment authorization number of the consumer to obtain a network payment token. As used herein, the term "network payment token" refers to a tokenized version of a payment authorization number. Specifically, a network payment token can include a hashed or otherwise obfuscated version of the payment authorization number that includes a plurality of characters that the card network system 118 maps to the particular payment authorization number.

Once the card network system 118 provides the network payment token to the payment system 108, the payment system 108 then sends the network payment token to the merchant commerce platform 106 to initiate the payment transaction and process the consumer's purchase. Additionally, the card network system 118 can send a cryptogram associated with the payment transaction to the payment system 108. As used herein the term "cryptogram" refers to a code that the card network system 118 assigns to the payment transaction for use in authorizing use of the network payment token for the payment transaction. For example, a cryptogram can be a numeric code or other value that allows the payment system 108 to validate the use of the network payment token for the corresponding payment transaction. The payment system 108 also sends the cryptogram token to the merchant commerce platform 106.

The merchant commerce platform 106 can then send the network payment token, along with other payment transaction information to the payment gateway system 114 to process the payment transaction. In one or more embodiments, the payment gateway system 114 also communicates with the card network system 118 to transmit the payment transaction information, including the network payment token to the card network system 118 in connection with the payment transaction. The card network system 118 uses the network payment token to determine the corresponding payment authorization number and authorizes the payment transaction based on the cryptogram. The card network system 118 then sends the payment authorization number to the issuer, which transfers funds from a payment account of the consumer to a payment account (associated with an acquirer) of the merchant.

Figure 2A:
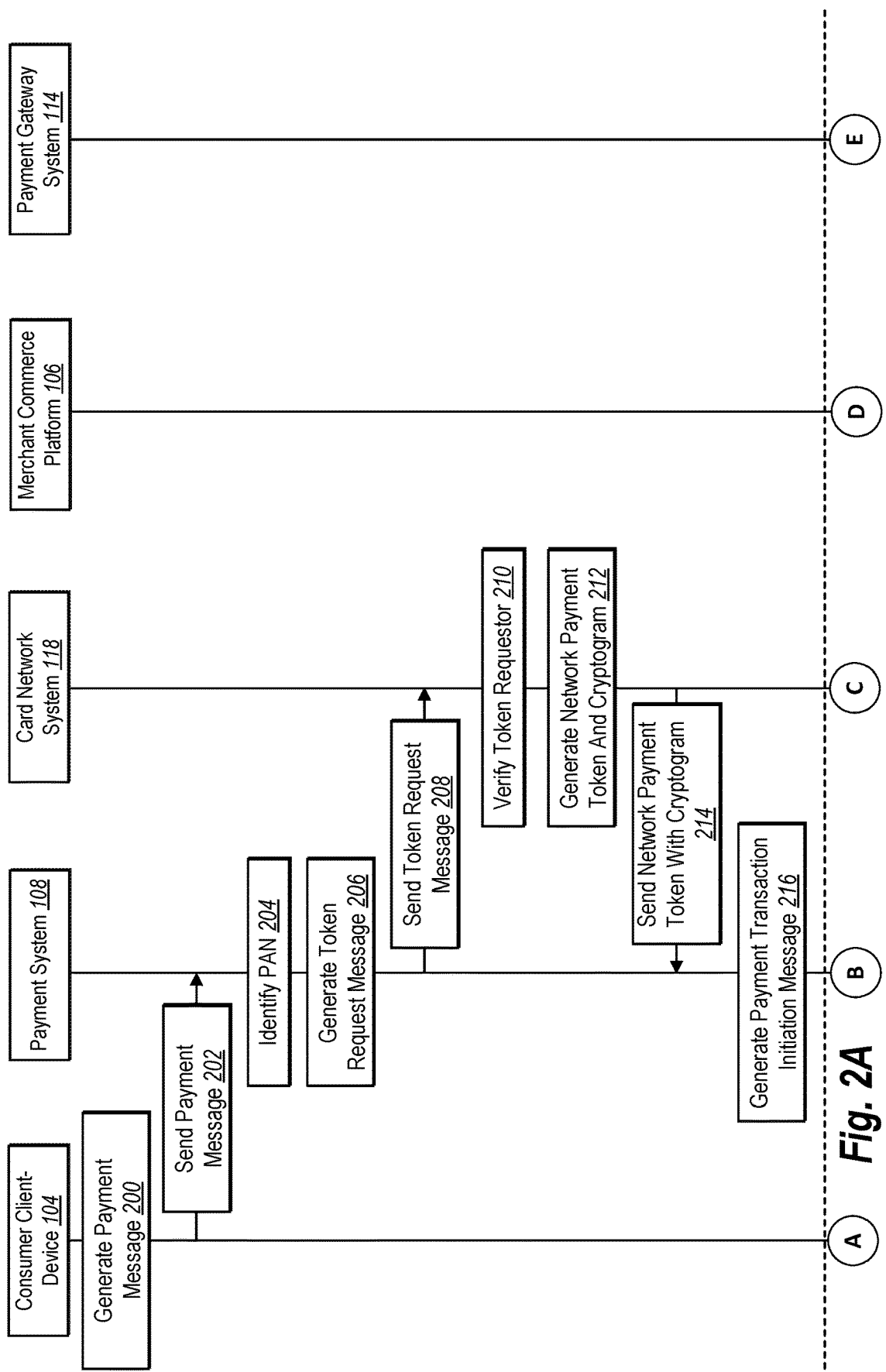
FIGS. 2A-2C illustrate a sequence-flow diagram illustrating interactions as part of a payment process between a consumer and a merchant in accordance with one or more embodiments.
Figure 2B:
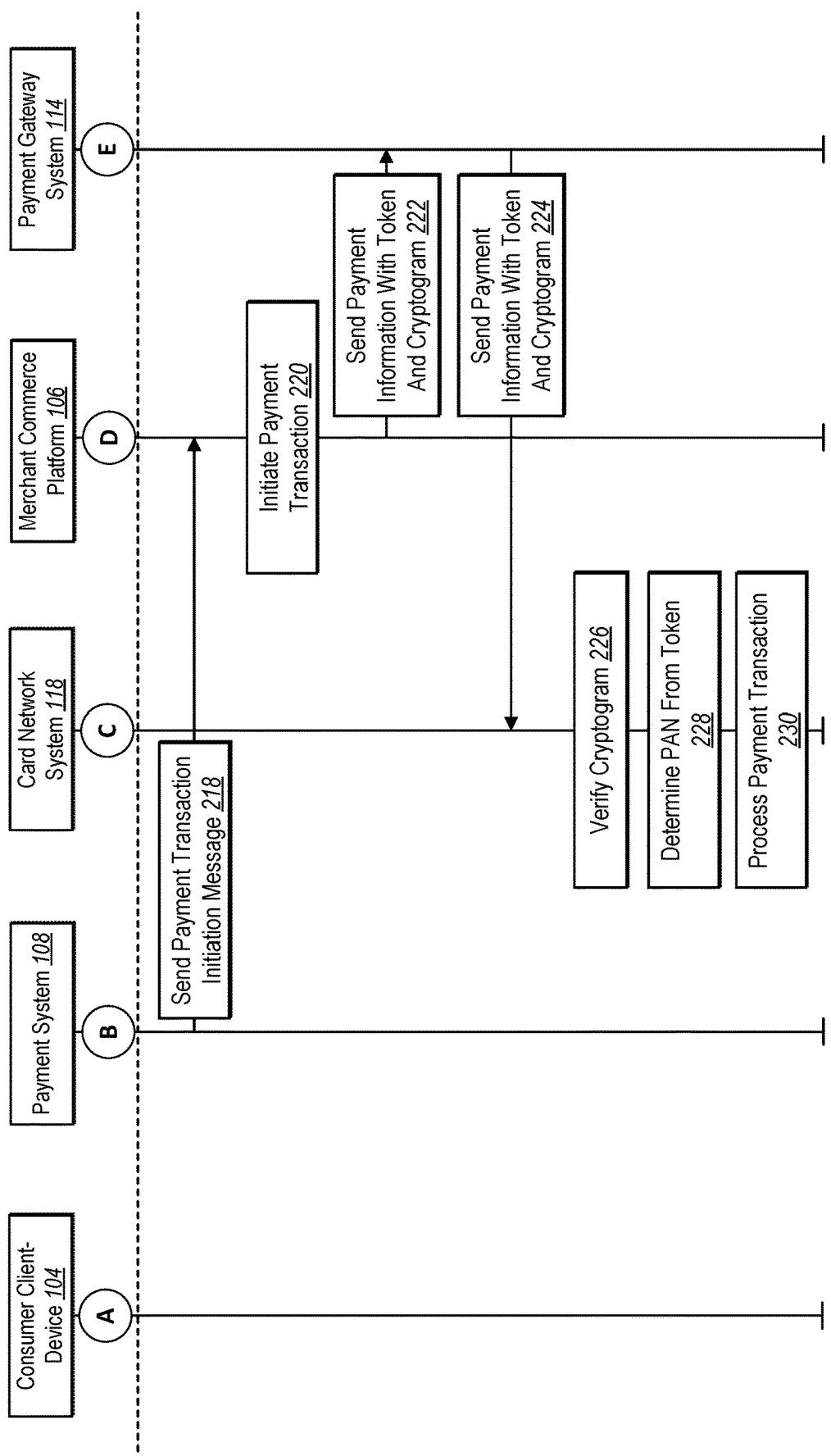
Figure 2C:
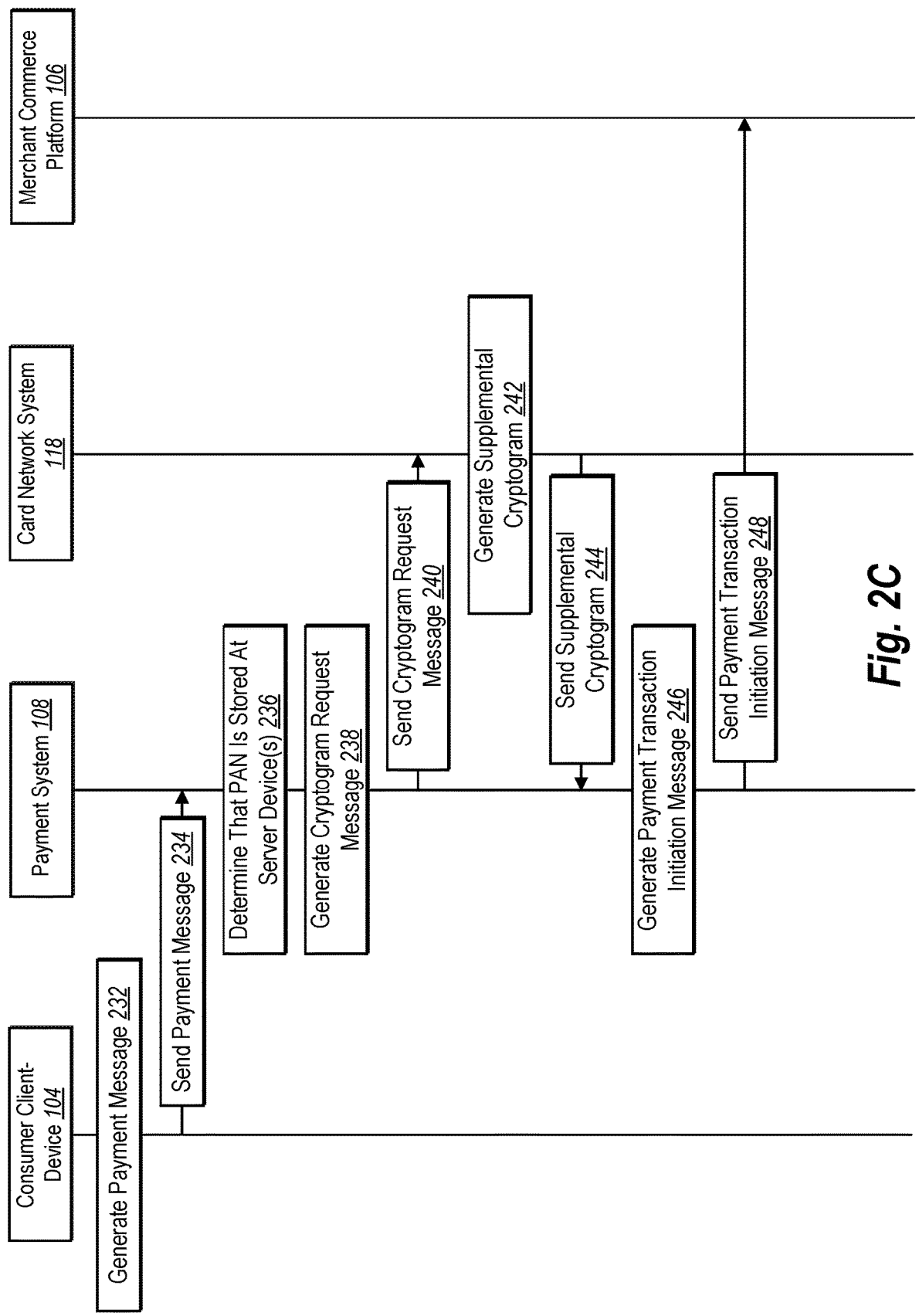

As discussed, the systems and components discussed above with reference to FIG. 1 can allow users to easily, effectively, and securely engage in payment transactions via a payment system 108. FIGS. 2A-2C illustrate example process diagrams of one or more example embodiments of processes implemented by the payment system 108 discussed above. Consistent with payment system 108 illustrated in FIG. 1, FIGS. 2A-2C illustrate (according to a sequence flow of operations) a consumer client-device 104, a merchant commerce platform 106, a payment system 108, a card network system 118, and an issuer 120.

In one or more embodiments, a process for a user ("consumer") requesting and initiating a transaction with another user ("merchant") can begin with the consumer associated with the consumer client-device 104 generating 200 a payment message in response to the consumer initiating a payment transaction with the merchant. Specifically, FIGS. 2A-2B illustrate a first payment transaction process for a consumer in which the payment system 108 request a payment authorization number from the consumer. For example, the consumer can access one or more user interfaces that allow the consumer to select an option to purchase a product or service from the merchant. To illustrate, selecting the option to purchase the product or service from the merchant causes the consumer client-device 104 to generate a payment message that includes payment information for a payment transaction between the consumer and the merchant. For example, the payment message can include a consumer identifier, a merchant identifier, a payment amount, product details, a payment authorization number, and/or other information that allows the payment system 108 to begin the payment transaction process. According to various examples, the consumer client-device 104 can obtain payment information for the payment message from interactions between the consumer and merchant, a data manager on the consumer client-device 104, and/or from user input. The consumer client-device 104 then sends 202 the payment message 202 to the payment system 108.

In response to receiving the payment message from the consumer client-device 104, the payment system 108 identifies 204 a personal authorization number for the consumer. In particular, the payment system 108 identifies the personal authorization number from the payment message. As mentioned, the personal authorization number can be a credit card number or other account number associated with a payment account of the consumer. The payment system 108 also identifies additional payment information included in the payment message.

The payment system 108 uses the payment information included in the payment message from the consumer client-device 104 to generate 206 a token request message. Specifically, the payment system 108 generates a token request message to request a network payment token associated with the identified payment authorization number. The token request message includes the payment authorization number and identification information that allows the card network system 118 to verify the identity of the consumer and/or the token requestor (i.e., the payment system 108). The payment system 108 requests the card network system 118 to provide the network payment token for use in processing payment transactions for the consumer, rather than using the payment authorization number.

In one or more embodiments, identification information included in the token request message includes a token requestor identifier. For example, the token requestor identifier can be a unique identifier that the card network system 118 previously assigned to the payment system 108. To illustrate, the token requestor identifier may be a fixed length value of 12 characters. The token requestor identifier is an identifier that allows the card network system 118 to determine an identity of the token requestor from the token request message.

In one or more embodiments, the payment system 108 can also determine whether network tokenization of a particular payment authorization number is available. Specifically, the payment system 108 can identify at least one attribute of the payment authorization number, such as the card type or consumer enrollment, based on one or more digits in the payment authorization number (e.g., based on a bank identification number). The payment system 108 can then determine whether the card network system 118 associated with the payment authorization number provides network payment tokens for the payment authorization number based on the identified attribute(s) of the payment authorization number. For example, the payment system 108 can determine that certain card network systems 118 provide network payment tokens, while other card network systems 118 do not. Similarly, certain card types or payment authorization tokens from a card network system 118 may be tokenized, while others associated with the same card network system 118 may not be tokenized.

If a particular payment authorization number is not tokenizable, the payment system 108 can process the payment transaction using conventional payment processing methods (i.e., using the payment authorization number and/or gateway tokenization). For example, the payment system 108 can provide additional identification information to the card network system 118. Alternatively, the payment system 108 can request a single-use payment authorization number from the payment gateway system 114 for use with the current payment transaction. Specifically, the payment gateway system 114 can communicate with the PAN issuer to verify payment credentials The payment system 108 sends 208 the token request message to the card network system 118 corresponding to the payment authorization token. Upon receipt of the token request message, the card network system 118 identifies the payment authorization number from the token request message and verifies the authenticity of the payment authorization number. For example, the card network system 118 identifies the payment authorization number in a database of payment authorization numbers associated with the card network system 118. Additionally, the card network system 118 can identify additional information associated with the payment authorization number, such as an identity of the consumer, security information associated with the consumer, and payment transaction information from the token request message, as provided by the server device(s).

In one or more embodiments, the card network system 118 verifies 210 the token requestor using the token requestor identifier in the token request message. The identity of the token requestor allows the card network system 118 to identify a trust level established between the card network system 118 and the payment system 108. Specifically, the card network system 118 may establish trust relationships with one or more token requestors. For example, each trusted token requestor may request network payment tokens from the card network system 118 without requiring additional security information.

If another entity that is not trusted by the card network system 118 attempts to request a network payment token from the card network system 118, the card network system 118 may reject the request. By establishing trust relationships with token requestors and providing tokens only to trusted requestors, the card network system 118 may reduce the risk of fraudulent requests for network payment tokens. Additionally, the use of trusted requestors allows the card network system 118 to reduce the amount of identification information that the consumer must provide to authorize payment transactions. In alternative embodiments, the card network system 118 requests additional security information to verify the authenticity of requests from untrusted requestors.

Once the identity of the payment system 108 is verified, the card network system 118 then generates 212 a network payment token for the payment authorization number and a cryptogram for the payment transaction. In particular, the card network system 118 generates a network payment token that represents the payment authorization number to entities associated with the payment transaction process. For example, the network payment token can be a numerical value with a variable number of digits within a predetermined number of digits (e.g., a variable field of up to 19 digits).

In one or more embodiments, the network payment token has the same number of digits as the payment authorization number so that each entity associated with the payment transaction process sees the network payment token as a valid payment authorization number. Specifically, the network payment token may have a similar or same bank identification number and similar numbering logic as the original payment authorization number. Alternatively, the number of digits may not be based on the payment authorization number, such that the network payment token may have a different number of digits than the payment authorization number.

The card network system 118 generates the cryptogram for use with the current payment transaction. Specifically, the cryptogram is a single-use code or value that ties or scopes the network payment token to the current payment transaction. In one or more embodiments, the cryptogram scopes the network payment token to the current payment transaction using transaction information such as payment amount, domain, and/or other information that specifically identifies the payment transaction. The cryptogram allows the card network system 118 to verify that the network payment token has been authorized for use with the current payment transaction. Thus, the card network system 118 denies requests from merchants to process payment transactions without a cryptogram, such that the card network system 118 denies unauthorized uses of the network payment token. Additionally, because the cryptogram is associated with the specific payment transaction, the cryptogram is a single-use cryptogram and may not be used with other payment transactions. In one or more alternative embodiments, the payment system 108 is allowed to use a cryptogram more than once for subscriptions or other recurring payments. While the figures illustrate the card network system 118 as a single entity, one will appreciate in light of the disclosure herein that the present invention is not so limited. In particular, the card network system 118, like the payment system 108, can be implemented across multiple different devices. For example, the card network system 118 can comprise a token provisioning service that is hosted by a separate system than the portion of the card network system 118 that processes payments. The token provisioning service of the network system 118 can generate the network payment tokens and the cryptograms in one or more embodiments.

The card network system 118 then sends 214 the network payment token with the cryptogram to the payment system 108. According to one or more embodiments, the payment system 108 associates and stores the network payment token with the user profile or user account of the consumer. As described in more detail below, once the payment system 108 has received a network payment token for the consumer, future payment transactions involving the consumer can use the stored network payment token instead of the corresponding payment authorization number.

The payment system 108 generates 216 a payment transaction initiation message for initiating the payment transaction with the merchant commerce platform 106. In particular, the payment system 108 generates the payment transaction initiation message to include payment transaction information that allows the merchant commerce platform 106 to process the purchase for goods or services. For example, the payment transaction initiation message can include the network payment token, the cryptogram, the payment amount, a transaction identifier, purchase information, and other information that allows the merchant commerce platform 106 to correctly process the payment transaction. The payment system 108 then sends 218 the payment transaction initiation message to the merchant commerce platform 106.

In one or more embodiments, the network payment token is configured to resemble a valid payment authorization number. Thus, the merchant commerce platform 106 and payment gateway system 114 may interpret the network payment token as a valid payment authorization number. Additionally, in one or more embodiments, the cryptogram resembles a security code, such as a code verification value ("CVV number"), so that the payment system 108 passes the network payment token and the cryptogram to the merchant commerce platform 106 in a form that the merchant client device recognizes as valid payment credential information.

As illustrated in FIG. 2B, the merchant commerce platform 106 then initiates 220 the payment transaction using the information provided in the payment transaction initiation message. Specifically, the merchant commerce platform 106 identifies the network payment token and the cryptogram from the payment transaction initiation message. Additionally, the merchant commerce platform 106 can identify the payment amount, purchase information (e.g., product or service), consumer identification information (e.g., name, address, shipping information), and other information for processing the payment transaction. By using a network payment token, the merchant commerce platform 106 never receives or sees the actual payment authorization number associated with the consumer's payment account.

The merchant commerce platform 106 sends 222 the network payment token and the cryptogram, with the necessary payment transaction information, to the payment gateway system 114. The payment gateway system 114 then sends 224 the network payment token, the cryptogram, and the payment transaction information to the card network system 118 to complete the payment transaction. The card network system 118 verifies 226 the cryptogram to determine whether the payment transaction is valid. A valid cryptogram signifies to the card network system 118 that the payment transaction is valid, and was initiated via a trusted token requestor.

The card network system 118 also determines 228 the payment authorization number based on the network payment token. For example, the card network system 118 can map the network payment token to the payment authorization number in a database. The card network system 118 can search for the network payment token in the database to find the payment authorization number in an entry associated with the network payment token. Alternatively, the network payment token may be an encrypted version (e.g., hashed version) of the payment authorization number. The card network system 118 can decrypt the network payment token to find the payment authorization number.

After identifying the payment authorization number, the card network system 118 can process 230 the payment transaction. Specifically, processing the payment transaction involves sending the payment authorization number to the issuer so that the issuer can authorize a transfer of funds from a payment account associated with the payment authorization number to a payment account of the merchant. For example, the issue can transfer funds from the payment account of the consumer to the payment account of the merchant by communicating with a bank system (acquirer) associated with the merchant.

FIG. 2C illustrates a payment transaction process using an existing network payment token. According to one or more embodiments, after a consumer has provided a payment authorization number to the payment system 108 and the payment system 108 has obtained a network payment token from the card network system 118, the payment system 108 stores the network payment token. The payment system 108 may not store or use the payment authorization number to process supplemental (or additional) payment transactions involving the consumer, but store and use the network payment token instead.

The process begins with the consumer client-device 104 generating 232 a payment message associated with a supplemental payment transaction. Specifically, the consumer client-device 104 generates the payment message to include payment information associated with a purchase of goods or services. For example, the consumer client-device 104 may provide an authentication token in the payment message that the payment system 108 provided to the consumer client-device 104 for use in authenticating/identifying the consumer client-device. Thus, the payment message does not include the payment authorization number. The consumer client-device 104 then sends 234 the payment message to the payment system 108.

After receiving the payment message, the payment system 108 determines 236 that the network payment token is stored at the payment system 108. Because the payment system 108 has previously received the payment authorization number and obtained a network payment token that represents the payment authorization number, the payment system 108 does not need the payment authorization number from the consumer. For example, the payment system 108 accesses a user profile or user account of the consumer and determines that the network payment token is stored with the user profile or user account.

The payment system 108 generates 238 a cryptogram request message to request a supplemental cryptogram for the supplemental payment transaction. In particular, the payment system 108 generates the cryptogram request message to obtain a new single-use cryptogram that validates the supplemental payment transaction to link to the network payment token. For example, the cryptogram request message can also include the network payment token. The payment system 108 sends 240 the cryptogram request message to the card network system 118.

The card network system 118 identifies the supplemental payment transaction and generates 242 the supplemental cryptogram associated with the supplemental payment transaction. The card network system 118 can also link the supplemental cryptogram to the network payment token so that the network payment token is linked to the supplemental payment transaction. The card network system 118 can then send 244 the supplemental cryptogram to the payment system 108. Because the network payment token is already stored at the payment system 108, the card network system 118 does not send the network payment token a second time.

Upon receipt of the supplemental cryptogram, the payment system 108 then generates 246 a payment transaction initiation message for the supplemental payment transaction. Specifically, the payment system 108 generates the payment transaction initiation message to include the network payment token and the supplemental cryptogram, along with payment transaction information necessary to complete the supplemental payment transaction. The payment system 108 then sends 248 the payment transaction initiation message to the merchant commerce platform 106, and the supplemental payment transaction proceeds as described previously in FIG. 2B.

Although FIGS. 2A-2C illustrate examples payment transactions between a consumer and a merchant, the payment system 108 can support payment transactions between co-users of the payment system 108. Specifically, as mentioned previously, the payment system 108 obtains network payment tokens for compatible payment authorization numbers for use in payment transactions between any co-users of the payment system 108. For example, the co-users may be friends or acquaintances who have registered with a social networking system, regardless of whether the payment transaction is for a purchase of goods or services. By obtaining network payment tokens from the card network system 118, as well as a cryptogram that ties the network payment token to a particular payment transaction, the payment system can improve the security of confidential payment information throughout a payment transaction process. Additionally, the payment system 108 may simplify the payment transaction process by reducing the amount of security information that the consumers and payment system 108 must provide to verify identity with the payment network 112.

As will be described in more detail below, the payment system 108 can optionally be part of a networking application. The server device(s) 110 can also host the networking application. As described below, in one or more embodiments, the networking application comprise a social networking application. In any event, the networking application or optionally the payment system can provide, along and/or in combination with the other components, one or more graphical user interfaces. In particular, the components can allow a user to interact with a collection of display elements for a variety of purposes. In particular, FIGS. 3A-3F and the description that follows illustrate various example embodiments of the user interfaces and features of a client application that allow a consumer to enter into a payment transaction with a merchant.

For example, FIGS. 3A-3F illustrate various views of GUIs provided by a client application to facilitate electronic messaging and sending and receiving payments. FIGS. 3A-3F illustrate a consumer client-device 300 that can allow a user (e.g., a consumer) to interact with a merchant via the client application. Specifically, the client application allows the consumer to view information associated with goods and services provided by the merchant and to enter into a payment transaction with the merchant. As described in more detail below, the consumer and the merchant can communicate with each other via the client applications on the respective client devices.

FIGS. 3A-3F illustrate the consumer client-device 300 as a handheld device. As used herein the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

Figure 3D:
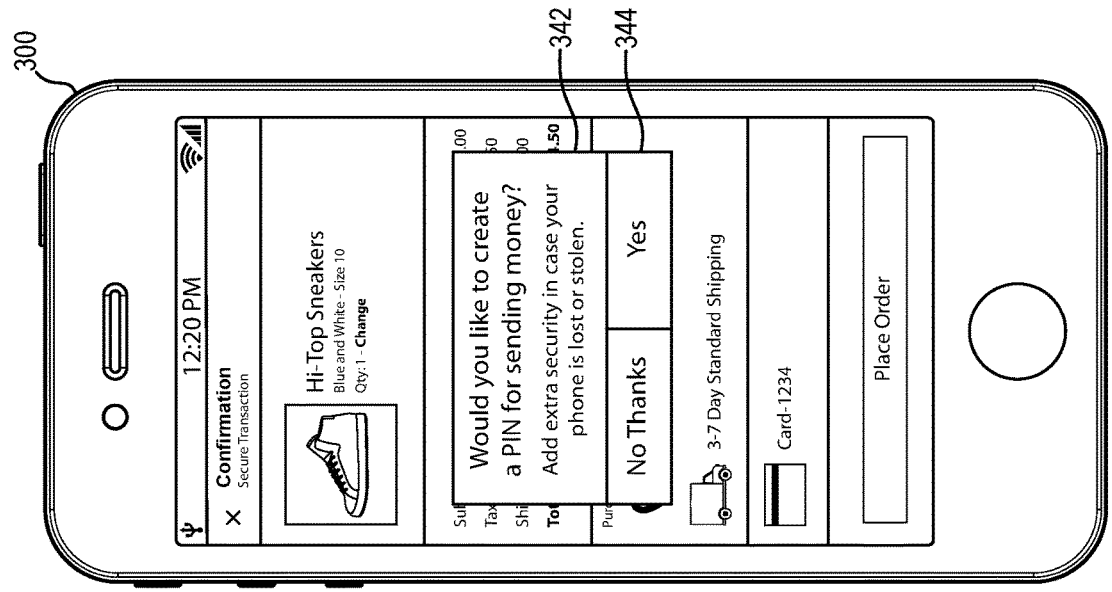

With reference to FIGS. 3A-3F, as mentioned, the consumer can interact with display elements in one or more user interfaces of the client application to initiate a payment transaction with a merchant to purchase a good or service. FIG. 3A illustrates a merchant page interface 302 of the client application. In one or more embodiments, the client application is associated with a social networking system, such that the merchant page interface 302 is accessible via the social networking system. The merchant page interface 302 can display a product or service provided by the merchant that consumers may purchase via the social networking system.

According to one or more embodiments, the merchant page interface 302 includes a plurality of products or services available from the merchant. For example, the merchant page interface 302 may include a listing of products, each of which may be selectable and/or have its own merchant page. Selecting the merchant page for a specific item displays details about the corresponding product. For example, the merchant page for a given product (as displayed in FIG. 3A) may display the price 304, product specifications 306, an image 308 of the product, and related items available from the merchant.

In one or more embodiments, the client application also allows the consumer to communicate with the merchant about the displayed item. For example, the merchant page interface 302 can present a communication option 310 to communicate with the merchant. To illustrate, selecting the communication option 310 can cause the client application to open a messaging interface that allows the consumer to communicate (e.g., by instant messaging) with the merchant. The consumer can discuss pricing, purchase options, delivery options, availability, customization, and/or other information about the displayed product.

The merchant product interface 302 can also display a purchase option 312 for a product on the merchant page for the product. Selecting the purchase option 312 can cause the client application to add the product to a virtual shopping cart and/or display a purchase interface. FIG. 3B illustrates a purchase interface 314 to purchase the product illustrated in FIG. 3A. When the consumer selects the purchase option 312, the client application adds the selected product to a virtual shopping cart and displays the purchase interface 314 with the contents of the shopping cart. The consumer can select a plurality of objects to add to the shopping cart prior to purchasing the product(s).

The purchase interface 314 includes purchase information including payment transaction information. In particular, the purchase information includes product details 316, (including the quantity of the product), a purchase price 318, shipping details, and a payment method for completing the payment transaction. Although FIG. 3B illustrates a set of details associated with the shopping cart, the purchase interface 314 may include additional or alternative details that allow the user to verify and enter purchase information.

In one or more embodiments, the purchase interface 314 includes an option 320 to provide a shipping address and an option 322 to provide a shipping method. For example, the consumer can select the option 320 to provide a shipping address and enter a delivery address for the product to be delivered. Additionally, the consumer can select the option 322 to provide a shipping method (e.g., express, standard, overnight). Changing the shipping method may cause the client application to update the price of the product by increasing or decreasing shipping fees. The purchase interface 314 may also provide a default shipping method (e.g., a free shipping method such as standard shipping).

The purchase interface can also include an option 324 to place the order for the product identified in the purchase interface 314. Specifically, if the consumer has previously added a payment credential, the option 324 to place the order uses the selected payment credential to process the order for the payment amount. Additionally, the consumer client-device 300 sends the payment transaction information to the payment system 108 hosted by the server device(s) 110 to initiate the payment transaction with the merchant.

Figure 3C:
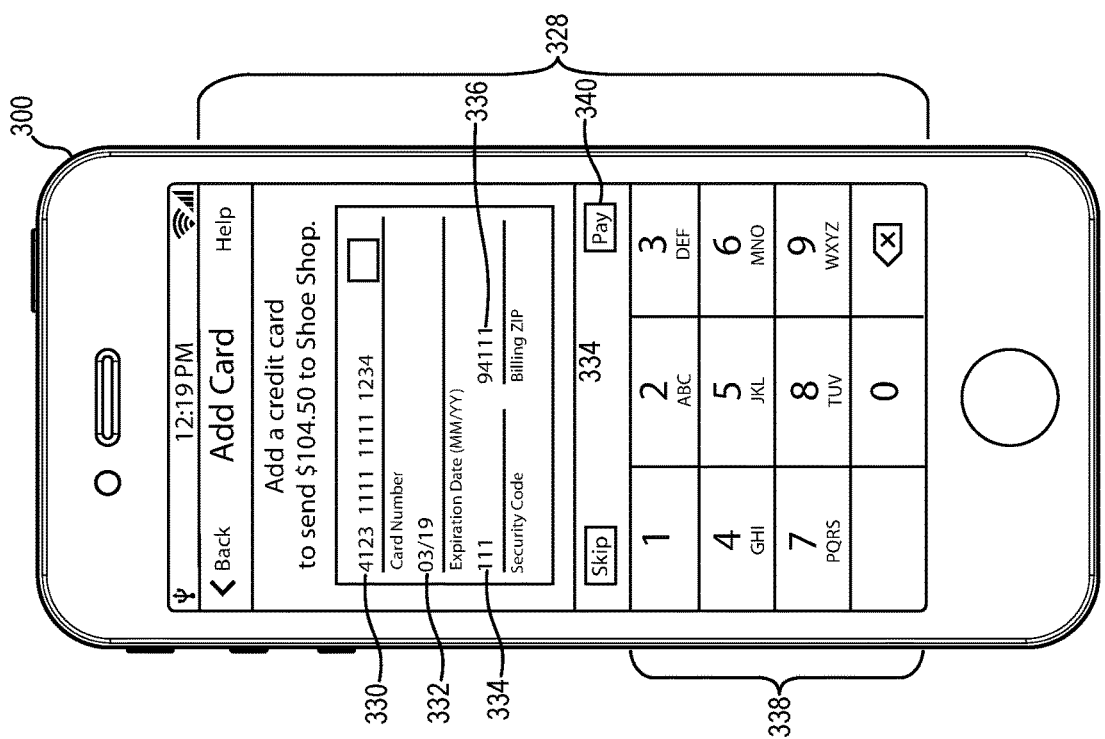

Alternatively, if the consumer has not previously added a payment credential, or if the consumer desires to add a new payment credential, the purchase interface 314 may also include a payment method option 326 for selecting or changing a payment method for completing the purchase. In one or more embodiments, the payment method option 326 allows the consumer to provide a card account in the purchase interface 314. Selection of the payment method option 326 can cause the client application to display a payment credential interface 328, as illustrated in FIG. 3C. Specifically, the payment credential interface 328 displays a plurality of fields in which the consumer enters payment credential information to add a payment credential for processing payment transactions. For example, the payment credential interface can include a payment authorization number field 330 for a payment authorization number, an expiration field 332 for an expiration date, a security code field 334 for a security code, and a ZIP code field 336 for entering a billing ZIP code. The payment credential interface 328 can include a keyboard interface 338 to allow the consumer to enter information into the corresponding fields.

In one or more embodiments, after adding the payment credential, the consumer can select a pay option 340 to pay the payment amount identified in the purchase interface of FIG. 3B. Selecting the pay option 340 initiates the payment transaction process with the payment system 108. Alternatively, the payment credential interface 328 can include an option to add the payment credential and return to the purchase interface from which the consumer can select the option to place the order.

In response to a selection of the pay option 340, or in response to a selection of the option to add the payment credential, the consumer client-device 300 sends payment credentials to the payment system 108, as previously described. Specifically, the consumer client-device 300 sends the payment authorization number with the other payment information to the payment system 108. The payment system 108 uses the payment authorization number to obtain a network payment token from the card network system 118 for processing the payment transaction. In one or more embodiments, the payment system 108 also sends an authentication token (which may be the network payment token or another token generated at the payment system 108) to the consumer client-device 300 to allow the consumer to initiate future payment transactions without re-entering the payment credentials.

According to one or more embodiments, after the consumer selects the pay option 340, the client application displays a message to the consumer requesting whether the consumer would like to enter a PIN for security. FIG. 3D illustrates a message 342 requesting whether the consumer would like to enter a PIN to provide additional security for initiating payment transactions using the consumer client-device 300. The message may be an overlay or a separate interface, as may serve a particular embodiment.

Figure 3F:
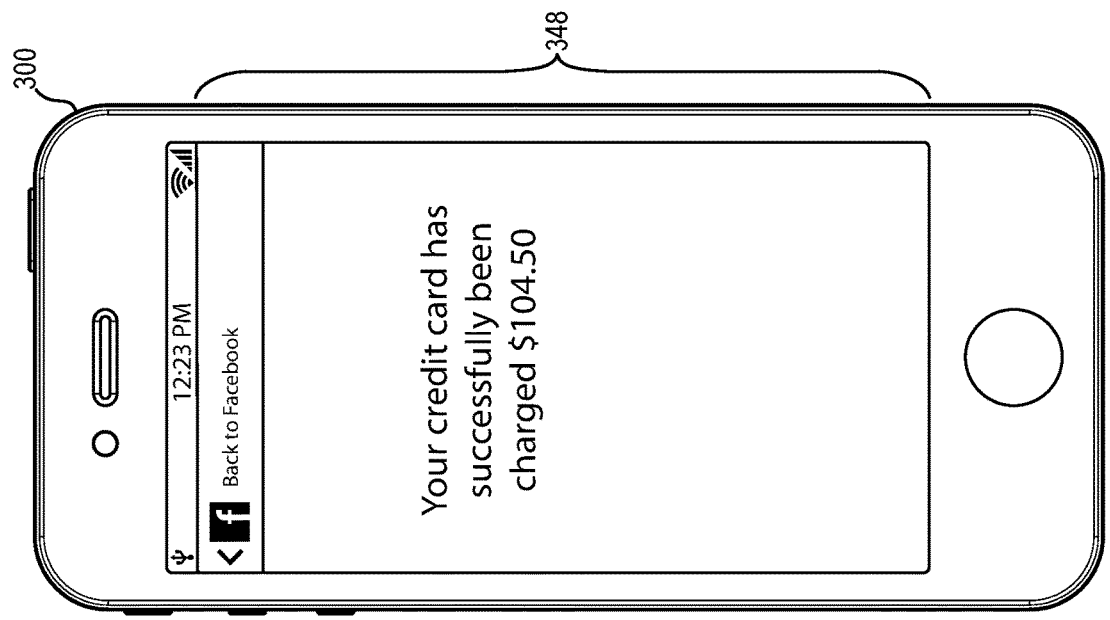
Figure 3E:
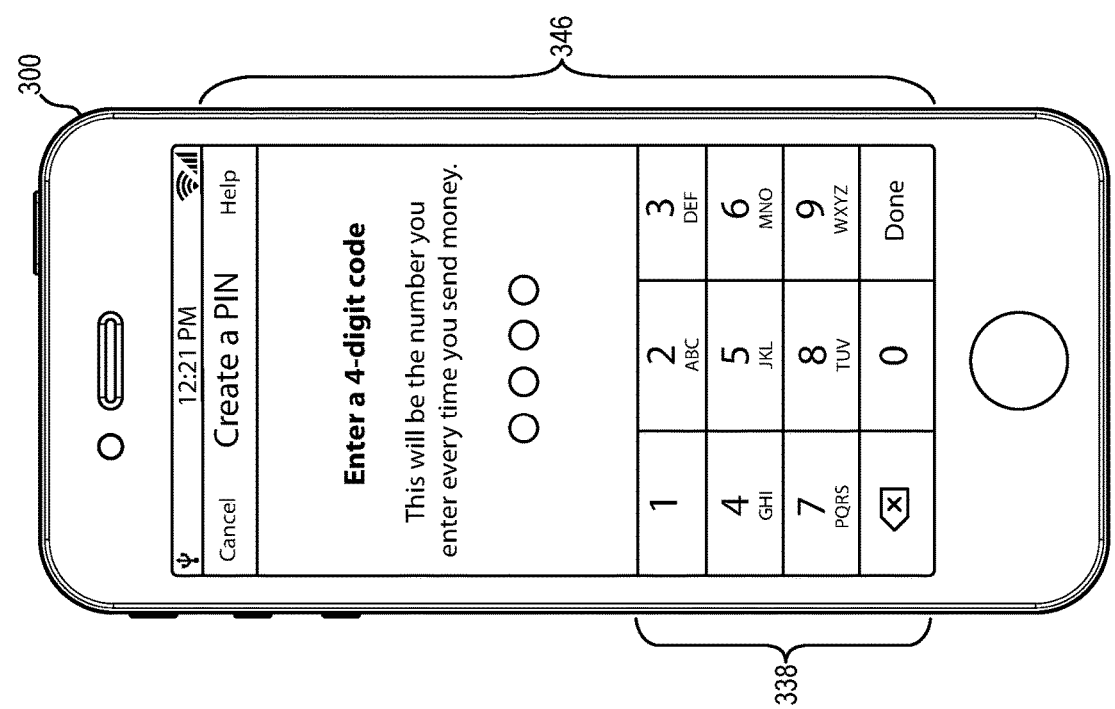

If the consumer selects an option 344 to enter a PIN, the client application can display a PIN interface 346 that allows the consumer to enter a PIN, as illustrated in FIG. 3E. The PIN interface 346 includes a keyboard interface 338 that allows the consumer to select a plurality of digits (e.g., a 4-digit code) as the PIN. Providing a PIN allows the consumer to add additional security measures in case the consumer client-device is lost or stolen. The PIN helps prevent fraudulent payment transactions from the consumer client-device. Alternatively, the consumer may choose not to enter a PIN for initiating payment transactions.

After the consumer provides payment credentials to the payment system 108, and after the payment system 108 obtain the network payment token and single-use cryptogram for the payment transaction from the card network system 118, the payment system 108 sends the network payment token and the cryptogram, along with additional payment transaction information to the merchant commerce platform 106, allowing the merchant to begin processing the payment transaction to complete the purchase of goods/services. As mentioned previously, the merchant commerce platform 106 begins processing the payment transaction without the merchant commerce platform 106 or payment gateway system ever receiving the payment authorization number.

After completing the payment transaction, the consumer client-device 300 can receive a notification from the the payment system 108 that the payment transaction is complete and cause the client application to display a successful payment message. The successful payment message 348, as illustrated in FIG. 3F, can indicate that the consumer's payment account was successfully charged for the payment amount. A completed payment transaction can also cause the client application to update a transaction history for the consumer, which the consumer may access to view details about previously initiated/completed/canceled payment transaction.

FIGS. 1-3F, the corresponding text, and the examples, provide a number of different systems and devices for processing electronic payment transactions using a payment system. In addition to the foregoing, embodiments can be described in terms of flowcharts comprising acts and steps in a method for accomplishing a particular result. For example, FIG. 4 illustrates a flowchart of an exemplary method in accordance with one or more embodiments.

Figure 4:
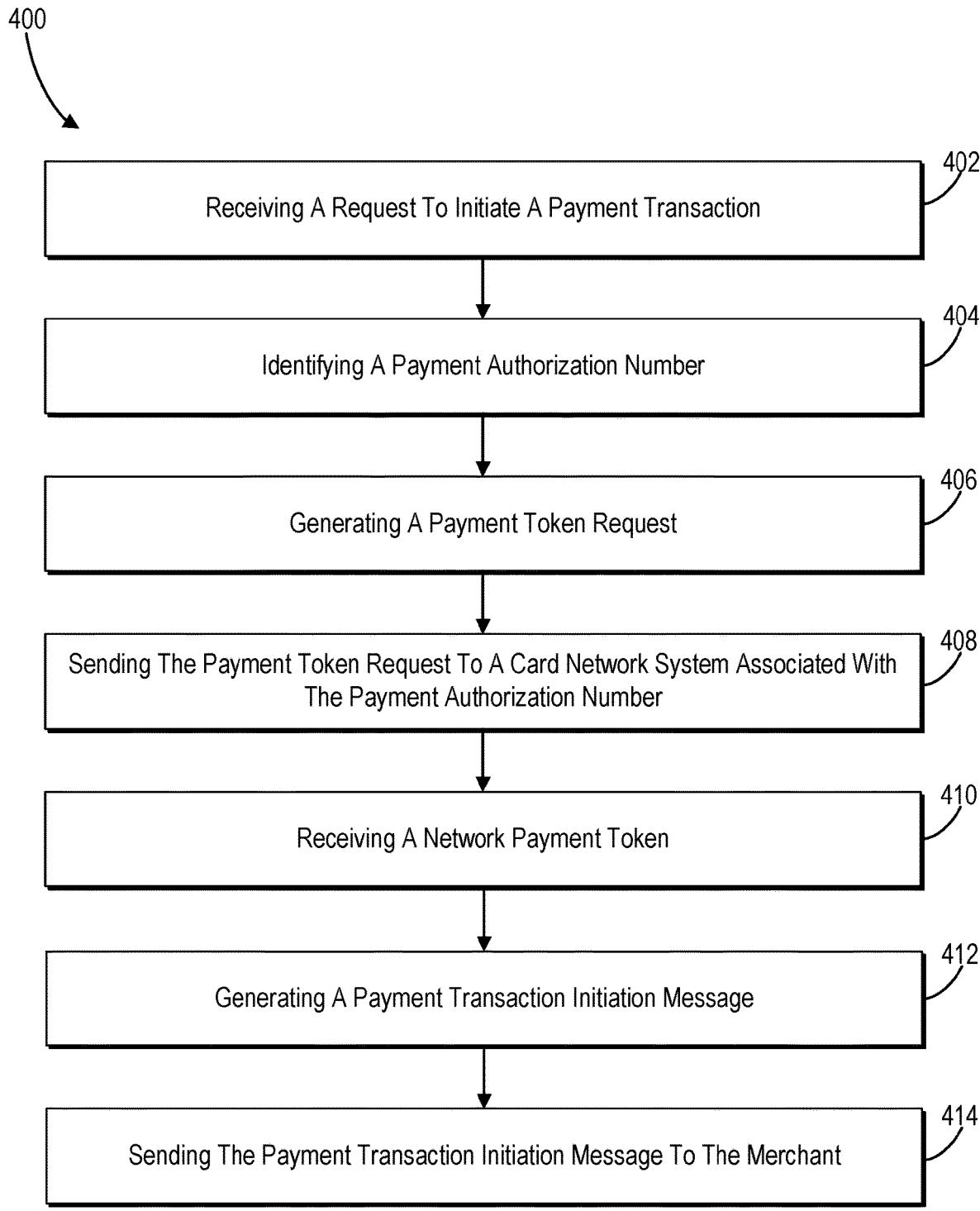
FIG. 4 illustrates a flow chart of a series of acts in a method of processing payment transactions with tokenized payment credentials in accordance with one or more embodiments.

FIG. 4 illustrates a flowchart of a method 400 of processing payment transactions with tokenized payment credentials. The method 400 includes an act 402 of receiving a request to initiate a payment transaction. For example, act 402 involves receiving, from a client device associated with a user account, a request to initiate a payment transaction with a merchant. To illustrate, act 402 can involve receiving the request to initiate the payment transaction in connection with a purchase order for a product or service provided by the merchant via a social networking system.

The method 400 also includes an act 404 of identifying a payment authorization number. For example, act 404 involves identifying a payment authorization number associated with the user account. Act 404 can involve identifying the payment authorization number from a user input from the client device 104 associated with the user account. Additionally, act 404 can involve identifying additional payment transaction information and payment credential information associated with the payment transaction with the merchant.

As part of act 404, or as an additional act, the method 400 can also involve receiving an authentication token from the client device 104, and determining that the received authentication token is associated with the user account. For example, the authentication token can be an authentication token assigned to the client device 104 by the one or more servers.

The method 400 further includes an act 406 of generating a payment token request. For example, act 406 involves generating a payment token request that includes the payment authorization number. Act 406 can also involve generating the payment token request to include a token requestor identifier associated with the one or more servers. For example, the token requestor identifier can be associated with a trust relationship between the one or more servers and the card network system associated with the payment authorization number.

Additionally, the method 400 includes an act 408 of sending the payment token request to a card network system 118. For example, act 408 involves sending the payment token request to a card network system associated with the payment authorization number. Act 408 can involve identifying the card network system associated with the payment authorization number based on one or more characteristics of the payment authorization number. To illustrate, act 408 can involve identifying card network system associated with the payment authorization number based on a combination of digits in the payment authorization number.

The method 400 also includes an act 410 of receiving a network payment token. For example, act 410 involves receiving, from the card network system associated with the payment authorization number, a network payment token representing the payment authorization number and a single-use cryptogram corresponding to the payment transaction. For example, the single-use cryptogram can tie the network payment token to the payment transaction. Act 410 can involve associating the network payment token with the user account, and storing the network payment token on the one or more servers. Act 410 can also involve removing the payment authorization number from the one or more servers in response to storing the network payment token on the one or more servers.

The method 400 includes an act 412 of generating a payment transaction initiation message. For example, act 412 involves generating a payment transaction initiation message comprising the network payment token and the single-use cryptogram. Act 412 can involve generating the payment transaction initiation message to include the network payment token, the single-use cryptogram, and payment transaction information for processing the payment transaction.

The method 400 also includes an act 414 of sending the payment transaction initiation message to the merchant. For example, act 414 involves sending the payment transaction initiation message to the merchant for processing the payment transaction. To illustrate, act 414 can involve sending the payment initiation message to a merchant client device associated with the merchant.

Act 414 can also involve inputting, in the payment transaction initiation message, the network payment token in a field corresponding to the payment authorization number and the cryptogram in a field corresponding to the card verification value. For example, the network payment token can include a number of digits equal to a number of digits of the payment authorization number. Additionally, the cryptogram can include a number of digits equal to a number of digits of a card verification value associated with the payment authorization number.

Figure 5:
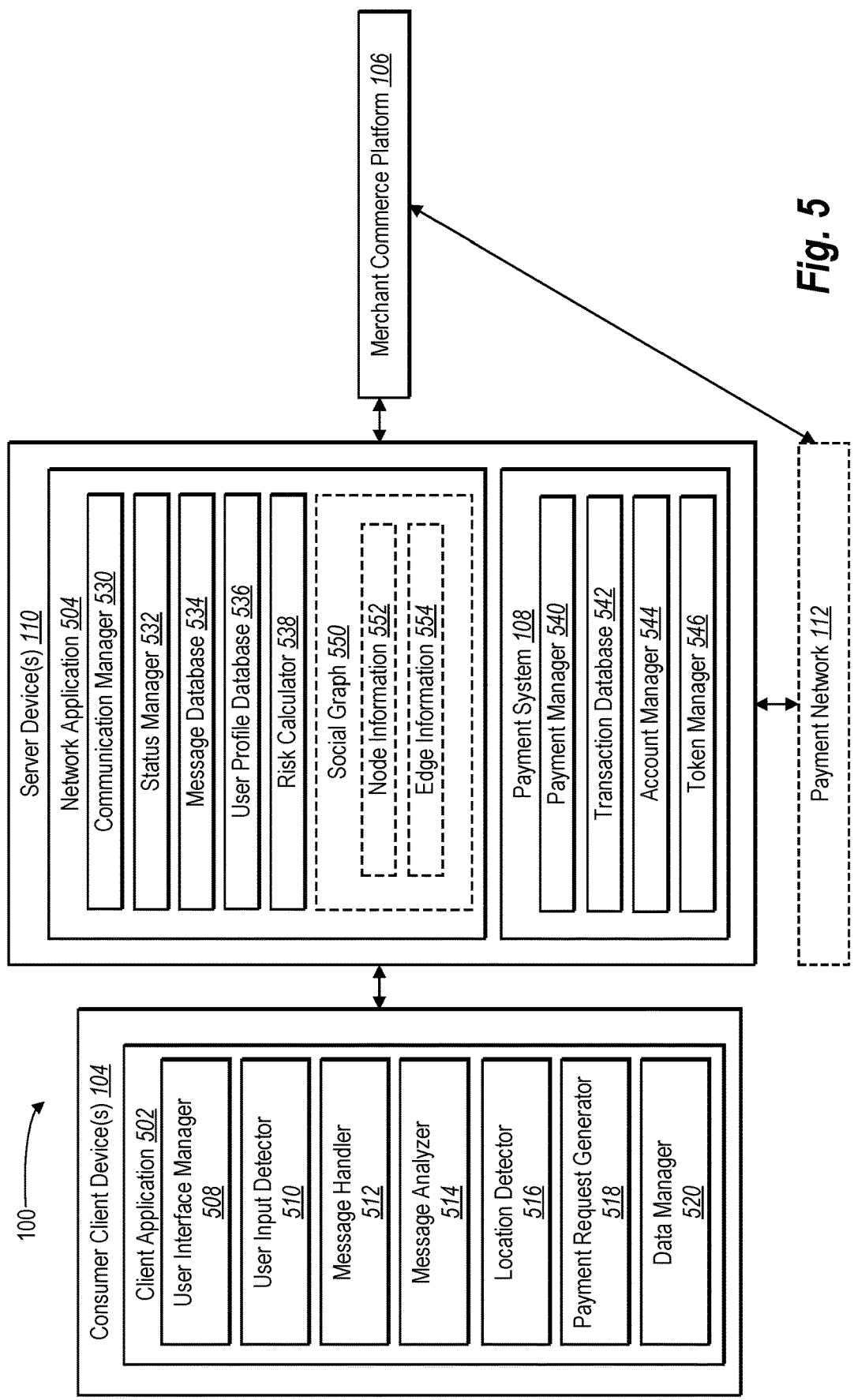
FIG. 5 illustrates a detailed schematic diagram of the environment of FIG. 1 in accordance with one or more embodiments.

FIG. 5 illustrates a schematic diagram illustrating additional details of the environment of FIG. 1 including the payment system 108 and the payment network 112. As shown, the environment 100 can include a consumer client-device 104 and a merchant commerce platform 106, and payment system 108. Additionally, the payment network 112 includes the payment gateway system 114, the card network system associated with the payment authorization number 118, and the issuer 120 as described above. In general, the payment system 108 allows a consumer associated with the consumer client-device 104 to send a payment to a merchant associated with the merchant commerce platform 106. Additionally, the payment system 108 can allow the consumer to exchange messages with the merchant.

FIG. 5 illustrates that the client device 106 includes a client application 502 (e.g., a messaging application, a social networking application, or an e-commerce application) with various components, and the server device(s) 110 include a network application 504 and they payment system 108 with various components. The components of the client application 502, the network application 504, and the payment system 108 can work together to allow a consumer to send payments to and/or exchange messages with a merchant, as described in greater detail below.

The client application 502 of FIG. 5 includes a user interface manager 508, a user input detector 510, a message handler 512, a message analyzer 514, a location detector 516, a payment request generator 518, and a data manager 520. FIG. 5 illustrates that the network application 504 includes a communication manager 530, a status manager 532, a message database 534, a user profile database 536, and a risk calculator 538. As described below, the network application 504 can also optionally include a social graph 550, which includes node information 552 and edge information 554. FIG. 5 further illustrates that the payment system 108 includes a payment manager 540, a transaction database 542, an account manager 544, and a token manager 546. Each of the components of the consumer client-device 104, the merchant commerce platform 106, and the server device(s) 110 can communicate with each other or with components using any suitable communication technologies. It will be recognized that although the components of the client devices 104 and the payment system 108 are shown to be separate in FIG. 5, any of the components may be combined into fewer components, such as into a single facility or module, or divided into more components as may serve a particular embodiment. While FIG. 5 describes certain components as part of the client application 502 and other components as part of the network application 504 or payment system 108, the present disclosure is not so limited. In alternative embodiments, one or more of the components shown as part of the client application 502 can be part of the network application 504 or payment system 108, or vice versa. Similarly, one or more components shown as part of the network application 504 can be part of the payment system 108 or vice versa.

The components can include software, hardware, or both. For example, the components can include computer instructions stored on a non-transitory computer-readable storage medium and executable by at least one processor of the client devices or the server device(s). When executed by the at least one processor, the computer-executable instructions can cause the client device(s) or the server device(s) to perform the methods and processes described herein. Alternatively, the components can include hardware, such as a special purpose processing device to perform a certain function or group of functions. Additionally or alternatively, the components can include a combination of computer-executable instructions and hardware.

In one or more embodiments, the client application 502 is a native application installed on the client device. For example, the client application 502 may be a mobile application that installs and runs on a mobile device, such as a smart phone or a tablet. Alternatively, the client application 502 can be a desktop application, widget, or other form of a native computer program. Alternatively, the client application 502 may be a remote application that the client device accesses. For example, the client application 502 may be a web application that is executed within a web browser of the client device.

As mentioned above, and as shown in FIG. 5, the client application 502 can include a user interface manager 508. The user interface manager 508 provides, manages, and/or controls a graphical user interface (or simply "user interface") that allows a user to compose, view, send, and receive messages, as well as send and receive payments. For example, the user interface manager 508 can provide a user interface that facilitates the composition of a message, such as an instant message. The user interface manager 508 can also provide user interfaces for engaging in browsing and purchasing goods or services from merchants.

More specifically, the user interface manager 508 may facilitate the display of a user interface (e.g., by way of a display device associated with the corresponding client device). For example, the user interface may be composed of a plurality of graphical components, objects, and/or elements that allow a user to compose, send and receive messages or payments. More particularly, the user interface manager 508 may direct the client device to display a group of graphical components, objects and/or elements that enable a user to view a messaging thread.

In addition, the user interface manager 508 may direct the client device to display a one or more graphical objects or elements that facilitate user input for composing and sending a message. To illustrate, the user interface manager 508 may provide a user interface that allows a user to provide user input to the client application 502. For example the user interface manager 508 can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

In addition to the forgoing, the user interface manager 508 can receive instructions or communications from one or more components of the client application 502 to display updated message information, updated status of a payment, updated status of a payment transaction, and/or updated available actions. The user interface manager 508 can update an available option based on whether a particular option is available at a particular point within the transaction process. The user interface manager 508 can add, remove, and/or update various other selectable actions within the sender and/or receiver status messages.

The user interface manager 508 can facilitate the input of text or other data to be included in an electronic communication or message. For example, the user interface manager 508 can provide a user interface that includes a keyboard. A user can interact with the keyboard using one or more touch gestures to select text to be included in an electronic communication. For example, a user can use the keyboard to enter a message to accompany and/or describe one or more other content items in an electronic communication. In addition to text, the user interface, including the keyboard interface, can facilitate the input of various other characters, symbols, icons, or other character information.

As further illustrated in FIG. 5, the client application 502 can include a user input detector 510. In one or more embodiments, the user input detector 510 can detect, receive, and/or facilitate user input in any suitable manner. In some examples, the user input detector 510 can detect one or more user interactions with respect to the user interface. As referred to herein, a "user interaction" means a single interaction, or combination of interactions, received from a user by way of one or more input devices.

For example, user input detector 510 can detect a user interaction from a keyboard, mouse, touch pad, touchscreen, and/or any other input device. In the event the client device includes a touchscreen, the user input detector 510 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 510 may additionally, or alternatively, receive data representative of a user interaction. For example, user input detector 510 may receive one or more user configurable parameters from a user, one or more user commands from the user, and/or any other suitable user input. The user input detector 510 may receive input data from one or more components of the client application 502, from the storage on the client device 200a, 200b, or from one or more remote locations (e.g., the network application).

The client application 502 can perform one or more functions in response to the user input detector 510 detecting user input and/or receiving other data. Generally, a user can control, navigate within, and otherwise use the client application 502 by providing one or more user inputs that the user input detector 510 can detect. For example, in response to the user input detector 510 detecting user input, one or more components of the client application 502 allow a user to select a recipient for a message, compose a message, select content to include in a message, and/or send a message to the recipient. In addition, in response to the user input detector 510 detecting user input, one or more components of the client application 502 allow a user to navigate through one or more user interfaces to review received messages, contacts, transaction history, etc.

In one or more embodiments, in response to the user input detector 510 detecting one or more user inputs, the client application 502 can allow a consumer to create a payment message to send to one or more other users, such as a merchant. For example, the consumer can interact with a payment element provided within a user interface. Upon detecting the user interaction with the payment element, the user input detector 510 can cause the user interface manager 508 to provide a user interface for creating a payment message. Therefore, in response to the user input detector 510 detecting one or more user inputs, the client application 502 can allow a user to create a payment message that defines a payment transaction for initiating between the consumer and the merchant.

As further illustrated in FIG. 5, the client application 502 includes a message handler 512 that manages messages provided to or sent from the client application 502. For example, the message handler 512 can interact with the user interface manager 508 and the user input detector 510 to coordinate the sending and receiving of messages using the client application 502. The message handler 512 may direct the sending and receiving of messages to and from the network application over the course of an electronic messaging session among a plurality of participants. The message handler 512 may organize incoming and outgoing messages and direct the user interface manager 508 to display messages.

In one or more embodiments, the message handler 512 can facilitate receiving and sending data via the client application 502. In particular, message handler 512 can facilitate sending and receiving messages. For example, the message handler 512 can package content to be included in a message and format the message in any necessary form that is able to be sent through one or more communication channels and using an appropriate communication protocol, as described herein. To illustrate, the message handler 512 can send payment transaction information to the server device(s) at various stages of a payment transaction process. Likewise, the message handler 512 can process messages the client device receives from other users.

In addition to providing communication functions for the client application 502, the message handler 512 can provide access to message data. For example, the message handler 512 can access data that represents a list of contacts, or one or more groups of contacts, to include and recipients to a message. To illustrate, the message handler 512 can obtain and provide data representing a contact list to the user interface manager 508 to allow the user to search and browse a contact list, and ultimately select an individual contact or group of contacts to include as recipients of a message. In one or more embodiments, a social-networking system can maintain remote contact list data (e.g., a "friends list"), and the message handler 512 can access the contact list data on the social-networking system for use within the client application 502.

The message handler 512 can also provide access to other local or remote data that the client application 502 can use to compose, send and receive messages. For instance, the message handler 512 can obtain access to files, images, audio, video and other content that a user can include in a message. Moreover, the message handler 512 can provide access to one or more functions of the client device to provide the user the ability to capture or create content to include within a message. For example, the message handler 512 can activate a camera, a microphone, or other function that allows the user to capture content to include in a message.

In addition, the message handler 512 can facilitate the sending of a payment associated with a payment transaction. In particular, FIG. 5 illustrates that the client application 502 can include a payment request generator 518 that can generate a payment request that the message handler 512 can send to the network application or the payment system 108 to initiate a payment process/transaction. For example, upon a sender selecting a payment element on a user interface, the payment request generator 518 can create a data package that includes payment information received from the consumer. A payment request can include an indication of an amount of money to be sent as part of the payment transaction as well as any necessary information to allow the network application and payment system 108 to perform a payment transaction.

In one or more embodiments, the payment request generator 518 can create a data package that includes the payment amount, one or more consumer identifiers, one or more merchant identifiers, one or more payment methods or sender account information (e.g., the payment authorization number), authorization information, currency information, a message or payment description, and/or any other data that may be helpful to facilitating a payment form the sender to the recipient. Alternatively, a payment request can identify a merchant, an amount of a payment, and an offline reference that allows the consumer client-device to resolve inconsistencies in data sent and received. The payment request generator 518 can pass the payment request (e.g., the data package that includes the payment information) to the message handler 512 to send to the network application and/or payment system 108.

The payment request generator 518 can also obtain payment information from various sources. For example, the payment request generator 518 can obtain payment information directly from the sender via the user input detector 510. Additionally, or alternatively, the payment request generator 518 can gain access to payment information maintained on the client device by the data manager 520. For example, the client application 502 can allow a consumer to input and save various payment methods and/or identify a default payment method, default currency, and otherwise specify other user preferences related to sending and/or receiving a payment.

The payment request generator 518 may also facilitate formatting of messages based on input from the user via the client application 502. Specifically, the payment request generator 518 can facilitate formatting payment requests according to the corresponding payment method. For example, the payment request generator 518 can determine that a consumer has input a request to pay a merchant in a payment transaction (e.g., a credit transaction or debit transaction) and format the payment request to the merchant accordingly.

In one or more embodiments, the payment request generator 518 can access and provide a token within a payment request. The token can be a token from the server device(s) to reference a payment credential stored by the network application. For example, the payment request generator 518 can retrieve a token to include in, or with, the payment request that verifies the sender and/or sender client device as authorized to make the payment using a payment credential stored by the network application. Alternatively, the token can reference a network payment token stored at the server device(s).

As mentioned above, the client application 502 can further include a message analyzer 514. The message analyzer 514 can analyze messages sent from and received by the client application 502 for events or attachments. In one or more embodiments, the message analyzer 514 can identify events from contextual content in the exchanged messages. For example, the message analyzer 514 can identify payment requests based on contextual information in a text message or instant message sent from the consumer to the merchant.

The client application 502 can further include a location detector 516. The location detector 516 can access or identify a location of the client device based on GPS information from the client device, cell tower triangulation, WIFI received signal strength indication, WIFI wireless fingerprinting, radio-frequency identification, near-field communication, by analyzing messages, or based on data from other sources. The location detector 516 can then provide the location of the client device to the message analyzer 514 or the network application. Additionally, the location detector 516 can receive indications of the location of other client devices from the network application and provide them to the message analyzer 514.

As discussed above, the client device can include a data manager 520, as illustrated in FIG. 5. The data manager 520 can maintain message data representative of data used in connection with composing, sending, and receiving messages between a user and one or more other users. For example, message data can include message logs, contact lists, content, past communications, past payment transactions, and other similar types of data that the client application 502 can use in connection with providing the ability for users to communicate using the client application 502.

The data manager 520 may also maintain payment data representative of information used to generate payment requests. For example, payment data may include a payment method data (i.e., a credential) and/or account data (e.g., bank or credit card account data). Furthermore, payment data can include payment preferences (e.g., a default payment method). In general, payment data can include any data that the payment request generator 518 can use in connection with generating a payment.

As briefly mentioned above, in addition to the client devices, the payment system can further include a network application that is implemented in whole or in part on the server device(s). In one or more embodiments of the present disclosure, the network application comprises a social-networking system (such as but not limited to FACEBOOK™), but in other embodiments the network application may comprise another type of application, including but not limited to an e-mail application, search engine application, banking application, or any number of other application types that utilizes user accounts.

In one or more embodiments where the network application comprises a social-networking system, the network application may include a social graph for representing and analyzing a plurality of users and concepts. Node storage of the social graph can store node information comprising nodes for users, nodes for concepts, nodes for transactions, and nodes for items. Edge storage of the social graph can store edge information comprising relationships between nodes and/or actions occurring within the social-networking system. Further detail regarding social-networking systems, social graphs, edges, and nodes is presented below with respect to FIG. 8.

The communication manager 530 can process messages received from client application 502. For example, the communication manager 530 can interact with a message handler 512 of a client application 502. The communication manager 530 can act as a director for messages sent back and forth among users in an electronic messaging thread. The communication manager 530 may receive a message from client application 502, detect the intended recipient of the message, and send the message to the client application 502

(or device) associated with the intended recipient. One will appreciate that the communication manager 530 can direct a message for a recipient to multiple client devices associated with the recipient (i.e., each device upon which the user has installed a version of the client application 502).

Additionally, the communication manager 530 can also re-format or otherwise modify the content or format of a message based on the messaging protocol used by a destination communication device or a type. As such, in one or more embodiments the payment system can allow participants using different communication platforms to exchange messages. For example, the communication manager 530 can receive a message in a first protocol (SMS, IM, XMPP, APNS, etc.), re-format the message into a second protocol, and send the reformatted message to the intended recipient(s).

The status manager 532 can track the status of users (e.g., consumers, merchants) of the client application 502s and/or the client devices. For example the status manager 532 can identify when a user is logged into the client application 502, when a user is active on the client application 502, when a client device associated with a user or user account is online or active. The status manager 532 can send indications (such as push notifications) to the client application 502 to notify the client application 502 of the status of users, device, messages, or payments. The user interface manager 508 can add, modify, or otherwise change or update status notifications based on indications received from the status manager 532. For example, the status manager 532 can send an indication to the client application 502 indicating that another user has accessed a message, received a payment, sent a payment, is active, a device or device type a co-user is active on (e.g., mobile vs. web), etc. The user interface manager 508 in turn an update a user interface to notify a user of the status.

The network application may also include a message database 534. The message database 534 can maintain message data representative of content of messages from electronic messaging sessions among a plurality of participants. The message database 534 may maintain status data representative of the information mentioned above that the status manager 532 tracks. The message database 534 can thus provide an archive of messaging threads, which the network application can provide to a user on demand or once a user logs into the client application 502 using a new computing device.

As mentioned previously, the server device(s) can include a payment system 108 having a payment manager 540. The payment manager 540 of FIG. 5 can integrate the sending and receiving of payment requests and initiate payment transactions, and may employ one or more application programming interfaces (APIs). For example, upon the communication manager 530 receiving a payment request, the communication manager 530 can send any payment details to the payment manager 540. The payment manager 540 can then use the payment details retrieved from the payment request to initiate a payment transaction using the payment network 112.

According to one or more embodiments, the payment system can maintain the payment system 108 separate from the network application. For example, the payment system can implement payment processes associated with the payment system 108 separately from at least some of the functionality of the network application (e.g., using a messaging database for recovery). To illustrate, the payment system can implement the functionality of the payment system 108 on a first group of one or more servers and the functionality of the network application on a second group of one or more servers. Implementing functionality of the payment system 108 and the network application on separate servers can allow the payment system to ensure that at least some of the financial information associated with the users is maintained apart from the network application to comply with Payment card Industry (PCI) standards. Alternative configurations of servers and/or software than those described herein may also allow the payment system to comply with PCI standards.

The payment manager 540 can coordinate a transaction corresponding to a payment defined in a payment request. As generally explained above, the payment manager 540 can coordinate a transaction via the payment network 112 that corresponds to a payment request, monitor the status of the transaction, and provide status information regarding the transaction. More specifically, the payment network 112 can authorize a transaction, fund a transaction, and/or settle an individual transaction or batch of transactions. In one or more embodiments, the payment manager 540 can use one or more application programming interfaces (API) to communicate relevant information with the payment network 112.

In additional or alternative embodiments, the client application 502 on the consumer client-device can cause the consumer client-device to send a payment request and/or messages associated with the payment request to the network application and the payment system 108 in parallel. In particular, when the client application 502 receives a selection by the consumer to pay an amount to the merchant, the client application 502 can cause the consumer client-device to send a payment request to the first network application and to the payment system 108. Thus, the network application can process the payment request while the payment system 108 is also processing the payment transaction associated with the payment request. In alternative embodiments, the consumer client-device can send messages to one or more servers associated with the network application, which can then forward the messages to the payment system 108, or vice versa.

To complete a transaction, the payment manager 540 can access or obtain payment credentials for the consumer and the merchant. Specifically, the payment manager 540 identifies a payment credential (e.g., a payment authorization number or a payment token) for the consumer in connection with a payment account of the consumer. Additionally, the payment manager 540 identifies a payment credential of the merchant in connection with a payment account of the merchant. The payment manager 540 can register one or more payment accounts or other payment credentials for the consumer and/or merchant with the network application.

Upon the consumer and/or merchant registering a deposit account or other payment credential, the user profile database 536 can maintain the payment credential for the consumer/merchant. After the payment manager 540 receives the payment information for a payment transaction from a consumer, the payment manager 540 can identify the merchant. The payment manager 540 can lookup the merchant in the user profile database 536 to determine if the merchant has registered a payment credential. At this point, the payment manager 540 can initiate the transaction using the payment credential information associated with the consumer and merchant.

The account manager 544 can manage one or more temporary accounts in connection with the networking application. For example, upon completion of a payment transaction, the payment manager 540 can deposit the payment amount to a temporary account for a recipient user (i.e., during a payment transaction for which tokenization of a payment authorization number is not available). The payment manager 540 can then settle any payment transactions with funds deposited into the temporary account at a specified time (e.g., at end of day). The payment manager 540 can also cause the communication manager 530 to notify the user of completed payment transactions before or after settling payment transactions.

As mentioned, the user profile database 536 stores user profile information for consumers and merchants. In one or more embodiments, user profile information includes payment credentials (i.e., a payment token representing a payment authorization number, as described previously) for a credit card, a debit card, a deposit account or other bank accounts, gift card accounts, store credit accounts, etc. The user profile database 536 can also store additional information associated with the payment credentials, such as expiration dates, security codes, address information, and/or other information. User profile information can also include one or more default payment method for payment transactions for one or more merchants or co-users.

In one or more additional embodiments, the payment manager 540 can communicate with the risk calculator 538 to determine a risk associated with a sender, a recipient, and/or a particular payment transaction. Specifically, the risk calculator 538 can determine whether the sender/recipient is a fraudster based on information associated with the sender/recipient in order to prevent fraudulent payment transactions. For example, the risk calculator 538 can determine the likelihood of fraudulent activity based on activity or information associated with the sender/recipient in connection with the network application. Determining a risk associated with users involved in payment transactions can also be useful in determining whether to process a particular payment transaction.

For example, in one or more embodiments, the network application can determine whether a risk associated with a particular user satisfies a predetermined threshold. In particular, the network application can determine whether a consumer is a fraudster (e.g., a scam account or software posing as a real person) based on a "realness" score. For example, if the risk associated with the sender is below a predetermined threshold (i.e., a high risk level), the network application can determine that the consumer is likely a fraudster and notify the payment system 108 that the consumer is a fraudster. If the consumer has a high-risk level, the payment system 108 can stop a payment transaction between the consumer and the recipient.

In additional embodiments, after determining a risk associated with a consumer, the network application can perform one or more actions in association with the risk. Specifically, the network application can perform an action that allows the network application to verify the identity of the consumer. For example, the network application can request information from the consumer that indicates the consumer is who the user purports to be. To illustrate, the network application can request a password entry, a number of digits of a registered payment credential for the consumer, a personal security question, an upload of a visual identification (e.g., a photo), or other identification mechanism based on the risk level or realness score of the user.

In additional or alternative embodiments, the network application can automatically perform one or more actions with respect to the payment request or a payment transaction in response to determining a risk level of the consumer. Specifically, the network application can perform an action that affects the payment request or a corresponding payment transaction between the consumer and the merchant without requesting additional information from the consumer. For example, the network application can allow the payment transaction, hold the payment transaction pending for review (e.g., by a bank of the consumer's payment credential), block the payment transaction, disable the consumer's account, or process the transaction without using an intermediate account (e.g., directly from the consumer's account to the merchant's account).

In any event, upon receipt of a payment request from a consumer, the payment manager 540 can detect the user (or group) ID of the consumer and retrieve the payment profile for that user (or entity). The payment manager 540 can then generate a transaction package (e.g., a "payment drone") that includes a transaction ID associated with a payment amount, the consumer, and the merchant. The transaction ID can help the payment system track money from the consumer's account, within the system in a temporary or intermediate account, and to the merchant's account. In some instances, the payment system can provide users access to the transaction ID to follow the movement of money during a corresponding payment transaction.

As mentioned previously, the payment manager 540 can obtain a payment token that represents a payment authorization number associated with the consumer's payment account. Specifically, the payment manager 540 can communicate with the card network system 118 at the payment network 112 to obtain a network payment token in response to sending a payment authorization number to the card network system 118. After receiving the network payment token, the payment manager 540 may initiate payment transactions for the consumer without requesting and/or storing the payment authorization number for the consumer. When the consumer sends a payment request to the server device(s), the payment manager 540 can send the network payment token as part of the payment information to the merchant for processing the payment transaction.

The payment manager 540 can perform various other additional steps and methods in order to effectively manage the payment process. In one or more embodiments, for example, upon receiving a payment request the payment manager 540 can generate a transaction identifier (or simply "transaction ID") and associate the transaction identifier with the payment request and/or the payment information within the payment request. For instance, upon generating a transaction ID, the payment manager 540 can send the transaction ID and the payment information to the transaction database 542. The transaction database 542 can include a data table or similar data matrix that stores transaction information according to transaction ID.

The transaction database 542 of FIG. 5 can provide storage for each transaction (such as in the form of a graph object), attempted or completed, the transaction ID, a date, an amount of the transaction, the payment method used, associated messages interchanged between sender and recipient related to the transaction, and any other information gathered on the transaction. The transaction database 542 can also store transaction information, such as requests associated with a user, the terms for a particular transaction, and number of payments or repayments performed and/or yet to be performed. With this information, the payment manager 540 can provide, upon request, a summary of one or more transactions to users as a history of payments requested, payments declined and payments completed.

In one or more embodiments, after a transaction ID is associated with a particular payment request, the transaction ID can be included or embedded within substantially all communications within the payment system relating to the particular payment. As such, the transaction ID allows the payment manager 540 to manage and process a large number of payments in an organized fashion. For example, the payment manager 540 can include instructions to include the transaction ID in any information sent to the client devices. In return, the message handlers 512 can also include the transaction ID in any information sent from the client devices to allow the payment manager 540 to efficiently and reliably identify a particular transaction to which the information corresponds.

In one or more embodiments, the transaction ID can be associated with one or more consumer identifiers, merchant identifiers, thread identifiers (e.g., identifying a messaging thread between the consumer and the merchant), payment amounts, payment methods (e.g., consumer accounts), deposit methods (e.g., merchant accounts), transaction history, current transaction status, as well as other transaction information. In one or more embodiments, the transaction database 542 maintains the transaction information in the form of one or more graph objects that are updated with any updates or actions with respect to a transaction.

As mentioned, the payment system 108 can also include a token manager 546. The token manager 546 can manage payment tokens associated with users of the payment system. For example, after the payment manager 540 requests and obtains a network payment token from a card network system 118 for a consumer's payment authorization number, the token manager 546 can associate the network payment token with the consumer's user account. The token manager 546 can associate the network payment token with the user profile of the consumer by storing information linking the network payment token to the user profile of the consumer, for example, at the user profile database 536.

The token manager 546 can communicate with the payment manager 540 and the user profile database 536 when the payment manager 540 receives a new payment request. Specifically, the token manager 546 identifies the network payment token for a consumer that sends the payment request based on payment information that identifies a user profile of the consumer. The token manager 546 can also identify other tokens associated with the consumer, such as gateway payment tokens or other security/authentication tokens that allow the consumer to initiate payment transactions, as may serve various embodiments.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
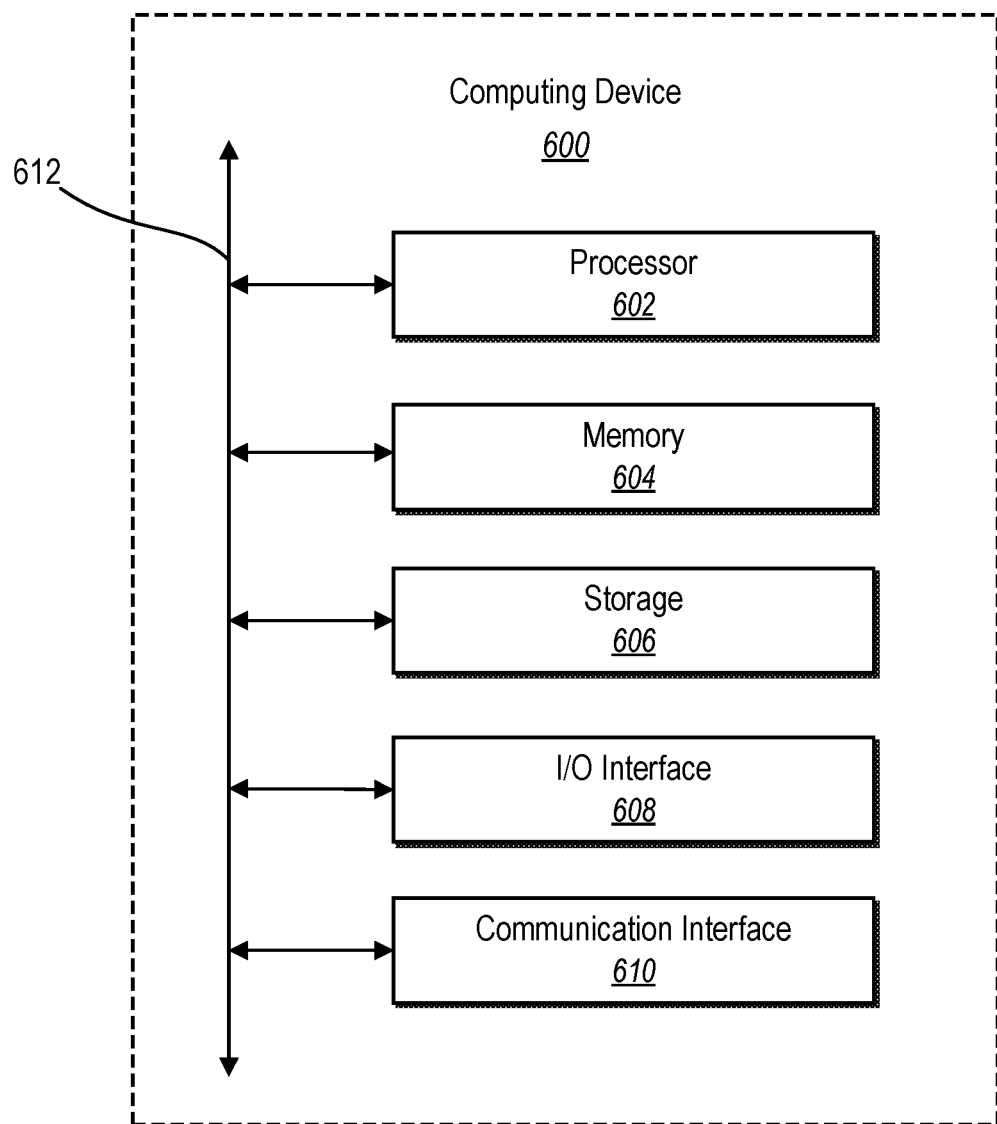
FIG. 6 illustrates a block diagram of an example computing device in accordance with one or more embodiments.

FIG. 6 illustrates a block diagram of exemplary computing device 600 that may be configured to perform one or more of the processes described above. One will appreciate that one or more computing devices such as the computing device 600 may implement the payment system 108. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the payment system 108 can comprise a social-networking system. A social-networking system may enable its users (such as persons or organizations) to interact with the system and with each other. As mentioned above, the payment system 100 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 7:
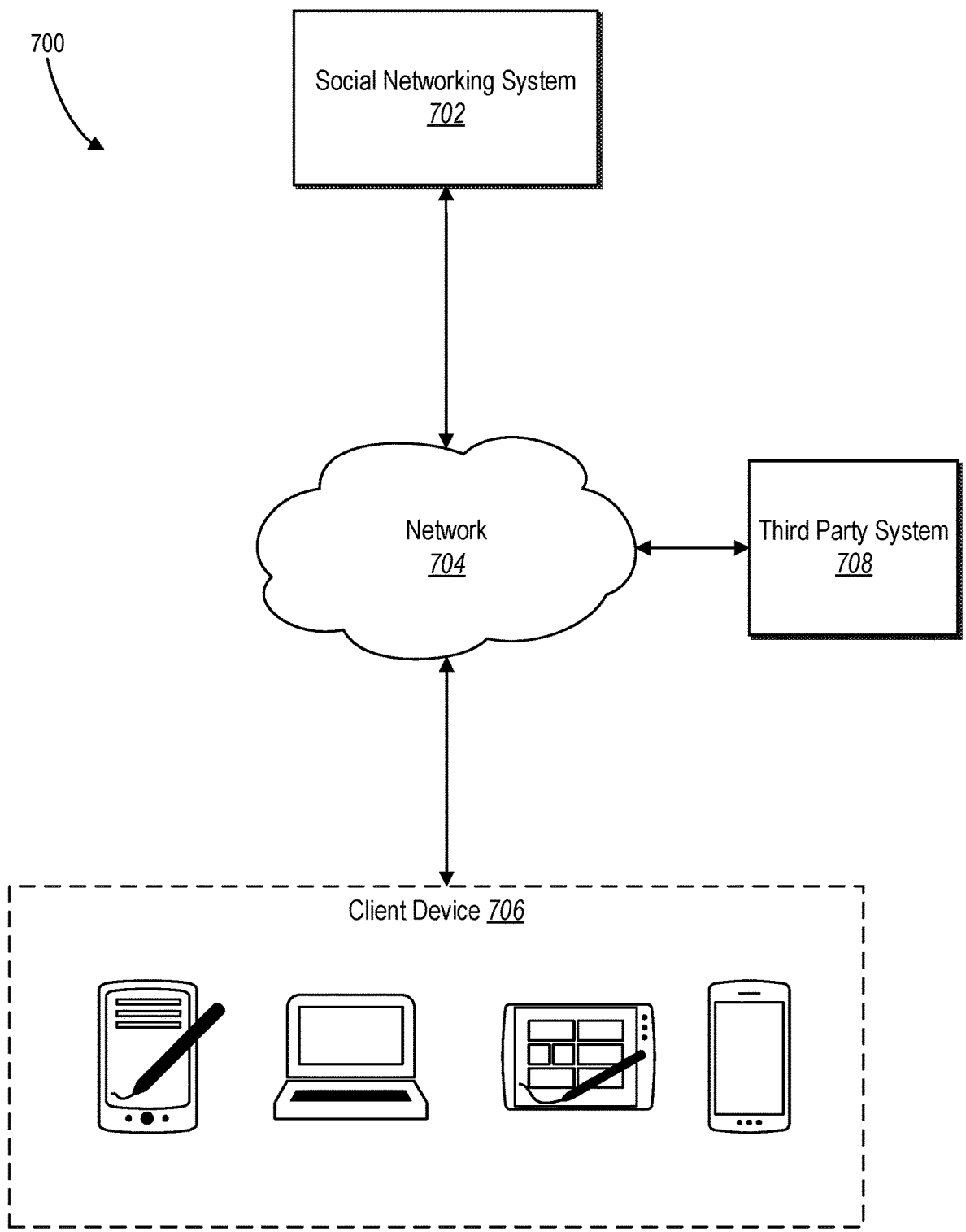
FIG. 7 illustrates an example network environment of a social-networking system in accordance with one or more embodiments.

FIG. 7 illustrates an example network environment 700 of a social-networking system. Network environment 700 includes a client system 706, a social-networking system 702, and a third-party system 708 connected to each other by a network 704. Although FIG. 7 illustrates a particular arrangement of client system 706, social-networking system 702, third-party system 708, and network 704, this disclosure contemplates any suitable arrangement of client system 706, social-networking system 702, third-party system 708, and network 704. As an example and not by way of limitation, two or more of client system 706, social-networking system 702, and third-party system 708 may be connected to each other directly, bypassing network 704. As another example, two or more of client system 706, social-networking system 702, and third-party system 708 may be physically or logically co-located with each other in whole or in part. Moreover, although FIG. 7 illustrates a particular number of client systems 706, social-networking systems 702, third-party systems 708, and networks 704, this disclosure contemplates any suitable number of client systems 706, social-networking systems 702, third-party systems 708, and networks 704. As an example and not by way of limitation, network environment 700 may include multiple client system 706, social-networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706, social-networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include any of the computing devices discussed above in relation to FIG. 7. A client system 706 may enable a network user at client system 706 to access network 704. A client system 706 may enable its user to communicate with other users at other client systems 706.

In particular embodiments, client system 706 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 702 may be a network-addressable computing system that can host an online social network. Social-networking system 702 may generate, store, receive, and send social-networking data, such as, for example, user-profile data, concept-profile data, social-graph information, or other suitable data related to the online social network. Social-networking system 702 may be accessed by the other components of network environment 700 either directly or via network 704. In particular embodiments, social-networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 706, a social-networking system 702, or a third-party system 708 to manage, retrieve, modify, add, or delete, the information stored in data store.

In particular embodiments, social-networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 702 may provide users of the online social network the ability to communicate and interact with other users. In particular embodiments, users may join the online social network via social-networking system 702 and then add connections (e.g., relationships) to a number of other users of social-networking system 702 whom they want to be connected to. Herein, the term "friend" may refer to any other user of social-networking system 702 with whom a user has formed a connection, association, or relationship via social-networking system 702.

In particular embodiments, social-networking system 702 may provide users with the ability to take actions on various types of items or objects, supported by social-networking system 702. As an example and not by way of limitation, the items and objects may include groups or social networks to which users of social-networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 702 or by an external system of third-party system 708, which is separate from social-networking system 702 and coupled to social-networking system 702 via a network 704.

In particular embodiments, social-networking system 702 may be capable of linking a variety of entities. As an example and not by way of limitation, social-networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social-networking system 702. In particular embodiments, however, social-networking system 702 and third-party systems 708 may operate in conjunction with each other to provide social-networking services to users of social-networking system 702 or third-party systems 708. In this sense, social-networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client system 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 702 also includes user-generated content objects, which may enhance a user's interactions with social-networking system 702. User-generated content may include anything a user can add, upload, send, or "post" to social-networking system 702. As an example and not by way of limitation, a user communicates posts to social-networking system 702 from a client system 706. Posts may include data such as status updates or other textual data, location information, photos, videos, links, music or other similar data or media. Content may also be added to social-networking system 702 by a third-party through a "communication channel," such as a newsfeed or stream.

In particular embodiments, social-networking system 702 may include a variety of servers, sub-systems, programs, modules, logs, and data stores. In particular embodiments, social-networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 702 may also include suitable components such as network interfaces, security mechanisms, load balancers, failover servers, management-and-network-operations consoles, other suitable components, or any suitable combination thereof. In particular embodiments, social-networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 702 to one or more client systems 706 or one or more third-party system 708 via network 704. The web server may include a mail server or other messaging functionality for receiving and routing messages between social-networking system 702 and one or more client systems 706. An API-request server may allow a third-party system 708 to access information from social-networking system 702 by calling one or more APIs. An action logger may be used to receive communications from a web server about a user's actions on or off social-networking system 702. In conjunction with the action log, a third-party-content-object log may be maintained of user exposures to third-party-content objects. A notification controller may provide information regarding content objects to a client system 706. Information may be pushed to a client system 706 as notifications, or information may be pulled from client system 706 responsive to a request received from client system 706. Authorization servers may be used to enforce one or more privacy settings of the users of social-networking system 702. A privacy setting of a user determines how particular information associated with a user can be shared. The authorization server may allow users to opt in to or opt out of having their actions logged by social-networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client systems 706 associated with users. Advertisement-pricing modules may combine social information, the current time, location information, or other suitable information to provide relevant advertisements, in the form of notifications, to a user.

Figure 8:
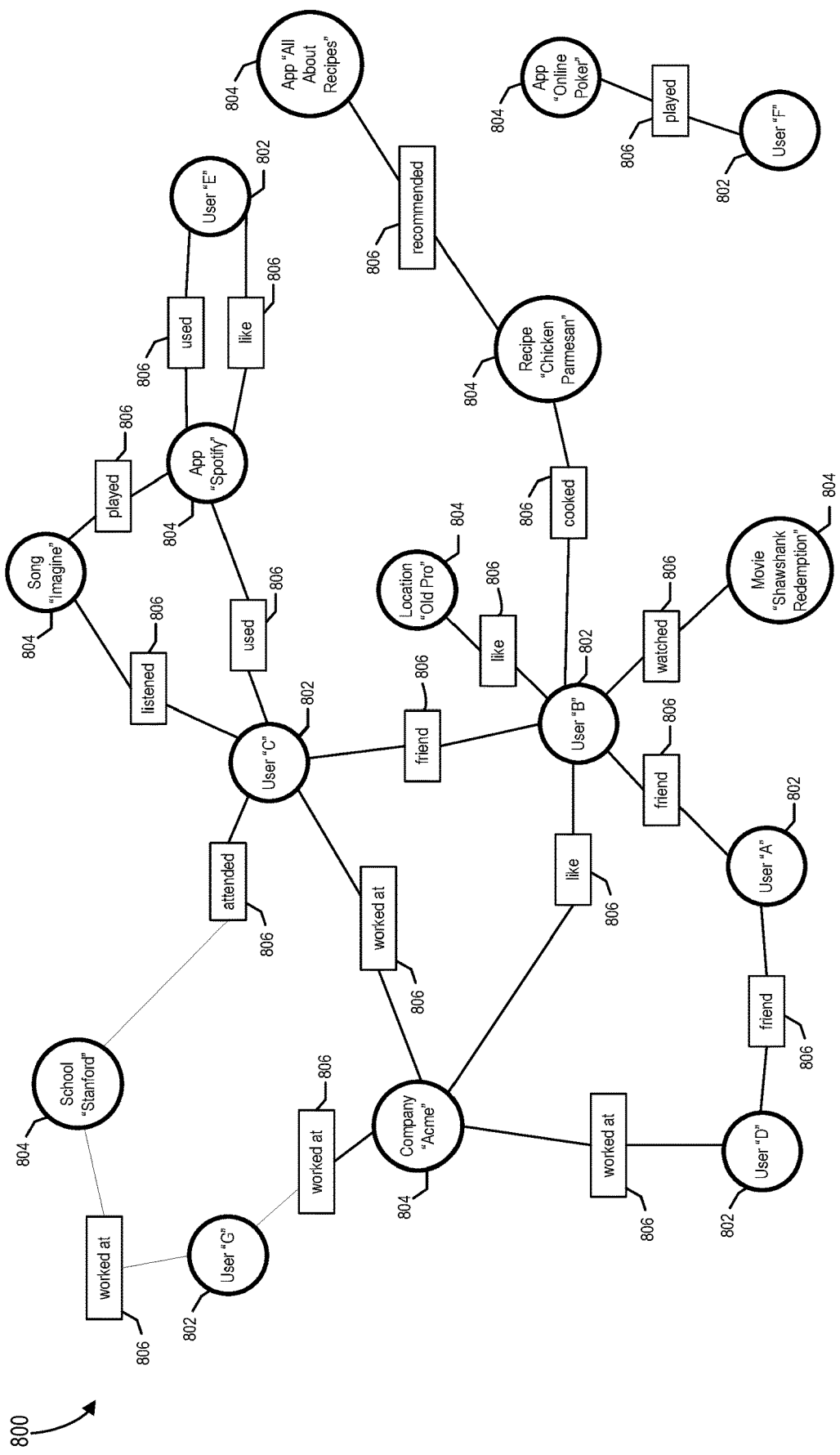
FIG. 8 illustrates an example social graph for a social-networking system in accordance with one or more embodiments.

FIG. 8 illustrates example social graph 800. In particular embodiments, social-networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 702, client system 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social-networking system 702. As an example and not by way of limitation, a user may be an individual (human user), an entity (e.g., an enterprise, business, or third-party application), or a group (e.g., of individuals or entities) that interacts or communicates with or over social-networking system 702. In particular embodiments, when a user registers for an account with social-networking system 702, social-networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 702. In particular embodiments, a user node 802 may be associated with information provided by a user or information gathered by various systems, including social-networking system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social-networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social-networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 702. Profile pages may also be hosted on third-party websites associated with a third-party server 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to social-networking system 702 a message indicating the user's action. In response to the message, social-networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 702 may send a "friend request" to the second user. If the second user confirms the "friend request," social-networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 702 may create an edge 806 between a user node 802 and a concept node 804 in social graph 800. As an example and not by way of limitation, a user viewing a concept-profile page (such as, for example, by using a web browser or a special-purpose application hosted by the user's client system 706) may indicate that he or she likes the concept represented by the concept node 804 by clicking or selecting a "Like" icon, which may cause the user's client system 706 to send to social-networking system 702 a message indicating the user's liking of the concept associated with the concept-profile page. In response to the message, social-networking system 702 may create an edge 806 between user node 802 associated with the user and concept node 804, as illustrated by "like" edge 806 between the user and concept node 804. In particular embodiments, social-networking system 702 may store an edge 806 in one or more data stores. In particular embodiments, an edge 806 may be automatically formed by social-networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 702) or RSVP (e.g., through social-networking system 702) to an event associated with the advertisement. In addition or as an alternative, an advertisement may include social-networking-system context directed to the user. As an example and not by way of limitation, an advertisement may display information about a friend of the user within social-networking system 702 who has taken an action associated with the subject matter of the advertisement.

In particular embodiments, social-networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 702 may calculate a coefficient based on a user's actions. Social-networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social-networking system 702 may analyze a user's actions to determine whether one or more of the actions indicate an affinity for subject matter, content, other users, and so forth. As an example and not by way of limitation, if a user may make frequently posts content related to "coffee" or variants thereof, social-networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 702 may calculate a coefficient based on the type of relationship between particular objects. Referencing the social graph 800, social-networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 702 may determine that the user has a higher coefficient with respect to the first photo than the second photo because having a tagged-in-type relationship with content may be assigned a higher weight and/or rating than having a like-type relationship with content. In particular embodiments, social-networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example and not by way of limitation, if a user is one mile from an airport and two miles from a gas station, social-networking system 702 may determine that the user has a higher coefficient for the airport than the gas station based on the proximity of the airport to the user.

In particular embodiments, social-networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 702 may provide information that is relevant to user's interests and current circumstances, increasing the likelihood that they will find such information of interest. In particular embodiments, social-networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social-networking system 702 may calculate the coefficient (or access the coefficient information if it has previously been calculated and stored). In particular embodiments, social-networking system 702 may measure an affinity with respect to a particular process. Different processes (both internal and external to the online social network) may request a coefficient for a particular object or set of objects. Social-networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   receiving, at one or more servers and from a client device associated with a user account, a first request to initiate a payment transaction with a merchant;
   identifying a payment authorization number associated with the user account;
   generating, by the one or more servers, a payment token request that includes the payment authorization number;
   sending, by the one or more servers, the payment token request to a card network system associated with the payment authorization number by bypassing a payment gateway system associated with the merchant, the payment gateway system being in communication with the card network system within a payment network;
   receiving, at the one or more servers and from the card network system associated with the payment authorization number, a network payment token representing the payment authorization number and a single-use cryptogram corresponding to the payment transaction;
   associating the network payment token with the user account;
   storing the network payment token on the one or more servers;
   generating, by the one or more servers and in response to receiving the network payment token, an authentication token corresponding to the user account to authenticate the client device in future payment transactions, the authentication token being different than the network payment token;
   sending, by the one or more servers, the authentication token to the client device associated with the user account;
   generating, by the one or more servers, a payment transaction initiation message comprising the network payment token and the single-use cryptogram;
   sending, by the one or more servers, the payment transaction initiation message to the merchant for the merchant to process the payment transaction by providing the network payment token and the single-use cryptogram to the payment gateway system;
   receiving, from the client device associated with the user account, a second request to initiate a supplemental payment transaction with the merchant, wherein the second request includes the authentication token and does not include the payment authorization number;
   determining, based on the authentication token, that the network payment token associated with the user account is stored on the one or more servers; and
   generating a second payment transaction initiation message comprising the network payment token and a supplemental single-use cryptogram.

2. The method as recited in claim 1,
   wherein the supplemental single-use cryptogram comprises a code that scopes the network payment token to the second payment transaction using transaction information from the second payment transaction.

3. The method as recited in claim 1, further comprising:
   requesting, from the card network system associated with the payment authorization number, the supplemental single-use cryptogram for the network payment token in accordance with the second payment transaction.

4. The method as recited in claim 3, wherein requesting the supplemental single-use cryptogram for the network payment token comprises:
   generating a cryptogram request for the supplemental single-use cryptogram corresponding to the network payment token;

sending the cryptogram request to the card network system associated with the payment authorization number; and receiving, from the card network system associated with the payment authorization number, the supplemental single-use cryptogram corresponding to the supplemental payment transaction.

5. The method as recited in claim 3, further comprising: sending the second payment transaction initiation message to the merchant for processing the supplemental payment transaction.

6. The method as recited in claim 2, further comprising removing the payment authorization number from the one or more servers in response to storing the network payment token on the one or more servers.

7. The method as recited in claim 1, wherein the merchant providing the network payment token and the single-use cryptogram to the payment gateway system causes the payment gateway system to provide the network payment token and the single-use cryptogram to the card network system, wherein the card network system uses the network payment token to determine the payment authorization number for authorizing the payment transaction.

8. The method as recited in claim 1, wherein the single-use cryptogram comprises a number of digits equal to a number of digits of a card verification value associated with the payment authorization number.

9. The method as recited in claim 8, wherein sending the payment transaction initiation message to the merchant comprises inputting, in the payment transaction initiation message, the network payment token in a field corresponding to the payment authorization number and the single-use cryptogram in a field corresponding to the card verification value.

10. The method as recited in claim 1, wherein generating the payment token request further comprises generating the payment token request to include a token requestor identifier associated with the one or more servers.

11. A system comprising:
one or more servers; and
at least one non-transitory computer readable storage medium storing instructions thereon, that, when executed by the one or more servers, cause the system to:
receive, from a client device associated with a user account, a first request to initiate a payment transaction with a merchant;
identify a payment authorization number associated with the user account;
generate a payment token request that includes the payment authorization number;
send the payment token request to a card network system associated with the payment authorization number by bypassing a payment gateway system associated with the merchant, the payment gateway system being in communication with the card network system within a payment network;
receive, from the card network system associated with the payment authorization number, a network payment token representing the payment authorization number and a single-use cryptogram corresponding to the payment transaction;
associate the network payment token with the user account;
store the network payment token on the one or more servers;

generate, in response to receiving the network payment token, an authentication token corresponding to the user account to authenticate the client device in future payment transactions, the authentication token being different than the network payment token;
send the authentication token to the client device associated with the user account;
generate a payment transaction initiation message comprising the network payment token and the single-use cryptogram;
send the payment transaction initiation message to the merchant for the merchant to process the payment transaction by providing the network payment token and the single-use cryptogram to the payment gateway system;
receive, from the client device associated with the user account, a second request to initiate a supplemental payment transaction with the merchant, wherein the second request includes the authentication token and does not include the payment authorization number;
determine, based on the authentication token, that the network payment token associated with the user account is stored on the one or more servers; and
generate a second payment transaction initiation message comprising the network payment token and a supplemental single-use cryptogram.

12. The system as recited in claim 11, further comprising instructions that, when executed by the one or more servers, cause the system to:
request, from the card network system associated with the payment authorization number, the supplemental single-use cryptogram for the network payment token in accordance with the supplemental payment transaction.

13. The system as recited in claim 12, further comprising instructions that, when executed by the one or more servers, cause the system to request the supplemental single-use cryptogram for the network payment token by:
generating a cryptogram request for the supplemental single-use cryptogram corresponding to the network payment token;
sending the cryptogram request to the card network system associated with the payment authorization number; and
receiving, from an issuer of the payment authorization number, a supplemental single-use cryptogram corresponding to the supplemental payment transaction.

14. The system as recited in claim 13, further comprising instructions that, when executed by the one or more servers, cause the system to:
send the second payment transaction initiation message to the merchant for processing the supplemental payment transaction.

15. The system as recited in claim 11, further comprising instructions that, when executed by the one or more servers, cause the system to generate the payment token request by generating the payment token request to include a token requestor identifier associated with the one or more servers.

16. A non-transitory computer readable storage medium storing instructions thereon that, when executed by at least one processor, cause a computer system to:
receive, from a client device associated with a user account, a first request to initiate a payment transaction with a merchant;
identify a payment authorization number associated with the user account;

generate a payment token request that includes the payment authorization number;

send the payment token request to a card network system associated with the payment authorization number by bypassing a payment gateway system associated with the merchant, the payment gateway system being in communication with the card network system within a payment network;

receive, from the card network system associated with the payment authorization number, a network payment token representing the payment authorization number and a single-use cryptogram corresponding to the payment transaction;

associate the network payment token with the user account;

store the network payment token on one or more servers of the computer system;

generate, in response to receiving the network payment token, an authentication token corresponding to the user account to authenticate the client device in future payment transactions, the authentication token being different than the network payment token;

send the authentication token to the client device associated with the user account;

generate a payment transaction initiation message comprising the network payment token and the single-use cryptogram;

send the payment transaction initiation message to the merchant for the merchant to process the payment transaction by providing the network payment token and the single-use cryptogram to the payment gateway systems;

receive, from the client device associated with the user account, a second request to initiate a supplemental payment transaction with the merchant, wherein the second request includes the authentication token and does not include the payment authorization number;

determine, based on the authentication token, that the network payment token associated with the user account is stored on the one or more servers; and generate a second payment transaction initiation message comprising the network payment token and a supplemental single-use cryptogram.

17. The non-transitory computer readable storage medium as recited in claim 16, further comprising instructions that, when executed by the at least one processor, cause the computer system to:

request, from an issuer of the payment authorization number, the supplemental single-use cryptogram for the network payment token in accordance with the supplemental payment transaction.

18. The non-transitory computer readable storage medium as recited in claim 17, further comprising instructions that, when executed by the at least one processor, cause the computer system to request the supplemental single-use cryptogram for the network payment token by:

generating a cryptogram request for the supplemental single-use cryptogram corresponding to the network payment token;

sending the cryptogram request to the card network system associated with the payment authorization number; and receiving, from the issuer of the payment authorization number, the supplemental single-use cryptogram corresponding to the supplemental payment transaction.

19. The non-transitory computer readable storage medium as recited in claim 18, further comprising instructions that, when executed by the at least one processor, cause the computer system to:

send the second payment transaction initiation message to the merchant for processing the supplemental payment transaction, wherein the second payment transaction initiation message further comprises payment transaction information associated with a purchase for a product or service from the merchant.

20. The non-transitory computer readable storage medium as recited in claim 16, further comprising instructions that, when executed by the at least one processor, cause the computer system to generate the payment token request by generating the payment token request to include a token requestor identifier, wherein the token requestor identifier is associated with a trusted relationship between a payment system and the card network system associated with the payment authorization number.

* * * * *